(12) United States Patent
Rangarajan et al.

(10) Patent No.: US 7,899,067 B2
(45) Date of Patent: Mar. 1, 2011

(54) METHOD AND APPARATUS FOR GENERATING AND USING ENHANCED TREE BITMAP DATA STRUCTURES IN DETERMINING A LONGEST PREFIX MATCH

(75) Inventors: Vijay Rangarajan, Sunnyvale, CA (US); Dalit Sagi, Ramat Hagolan (IL); William N. Eatherton, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 3210 days.

(21) Appl. No.: 10/161,504

(22) Filed: May 31, 2002

(65) Prior Publication Data
US 2004/0008634 A1    Jan. 15, 2004

(51) Int. Cl.
*H04L 12/56* (2006.01)
(52) U.S. Cl. .......... 370/408; 370/392; 370/400; 370/351
(58) Field of Classification Search .................. 370/392, 370/401, 389, 351, 408, 400; 707/100, 101, 707/102, 103, 104.1
See application file for complete search history.

(56) References Cited

U.S. PATENT DOCUMENTS

| | | |
|---|---|---|
| 5,528,701 A | 6/1996 | Aref |
| 5,651,099 A | 7/1997 | Konsella |
| 5,721,899 A | 2/1998 | Namba |
| 5,781,772 A | 7/1998 | Wilkinson, III et al. |
| 5,787,430 A | 7/1998 | Doeringer et al. |
| 5,809,501 A | 9/1998 | Noven |
| 5,829,004 A | 10/1998 | Au |
| 5,848,416 A | 12/1998 | Tikkanen |
| 5,884,297 A | 3/1999 | Noven |
| 6,018,524 A | 1/2000 | Turner et al. |
| 6,067,574 A | 5/2000 | Tzeng |
| 6,115,716 A | 9/2000 | Tikkanen et al. |

(Continued)

FOREIGN PATENT DOCUMENTS

EP    1168723 A2    1/2002

(Continued)

OTHER PUBLICATIONS

Donald R. Morrison, "Patricia—Practical Algorithm to Retrieve Information Coded in Alphanumeric," Journal of the ACM, vol. 15, No. 4, Oct. 1968, pp. 514-534.

(Continued)

*Primary Examiner* — Kwang B Yao
*Assistant Examiner* — Nguyen Ngo
(74) *Attorney, Agent, or Firm* — The Law Office of Kirt D. Williams

(57) ABSTRACT

Methods and apparatus are disclosed for generating and using an enhanced tree bitmap data structure in determining a longest prefix match, such as in a router, packet switching system. One implementation organizes the tree bitmap to minimize the number of internal nodes that must be accessed during a lookup operation. A pointer is included in each of the trie or search nodes to the best match so far entry in the leaf or results array which allows direct access to this result without having to parse a corresponding internal node. Moreover, one implementation stores the internal node for a particular level as a first element in its child array. Additionally, one implementation uses a general purpose lookup engine that can traverse multiple tree bitmaps or other data structures simultaneously, and perform complete searches, partial searches, and resume partial searches such as after receiving additional data on which to search.

19 Claims, 20 Drawing Sheets

U.S. PATENT DOCUMENTS

| | | | |
|---|---|---|---|
| 6,188,694 | B1 | 2/2001 | Fine et al. |
| 6,298,339 | B1 | 10/2001 | Bjornson |
| 6,560,610 | B1 | 5/2003 | Eatherton et al. |
| 6,697,363 | B1 | 2/2004 | Carr |
| 6,724,734 | B1 | 4/2004 | Shabtay et al. |
| 6,728,732 | B1* | 4/2004 | Eatherton et al. ......... 707/104.1 |
| 6,876,655 | B1* | 4/2005 | Afek et al. .................. 370/392 |
| 6,891,834 | B1 | 5/2005 | Dalley et al. |
| 6,915,291 | B2* | 7/2005 | Carlson et al. .................... 707/2 |
| 6,917,954 | B2 | 7/2005 | Ahmad et al. |
| 7,054,315 | B2 | 5/2006 | Liao |
| 7,106,732 | B2 | 9/2006 | Brown |
| 2002/0039350 | A1 | 4/2002 | Wang et al. |
| 2003/0108043 | A1 | 6/2003 | Liao |
| 2003/0174717 | A1* | 9/2003 | Zabarski et al. ............. 370/401 |
| 2004/0236720 | A1* | 11/2004 | Basso et al. ...................... 707/1 |
| 2005/0026603 | A9 | 2/2005 | Rajaram |
| 2005/0157712 | A1* | 7/2005 | Rangarajan et al. ......... 370/388 |
| 2005/0171959 | A1* | 8/2005 | Deforche et al. ............. 707/100 |
| 2007/0038626 | A1 | 2/2007 | Waters et al. |

FOREIGN PATENT DOCUMENTS

EP            1168723 A3     10/2002

OTHER PUBLICATIONS

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pp.

V. Srinivasan and George Varghese, "Faster IP Lookups using Controlled Prefix Expansion," ACM Sigmetrics Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick Mckewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Panicaj Gupta and Nick Mckeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

Waldvogel et al., "Scalable High Speed IP Routing Lookups," Computer Communications Review, ACM, Sep. 14, 1997, pp. 25-36.

* cited by examiner

```
node:= root; (* node is the current trie node being examined; so we start with root as the first trie node *)
i:= 1; (* i is the index into the stride array; so we start with the first stride *)
do forever
    if (treeFunction(node.internalBitmap,stride[i]) is not equal to null) then
            (* there is a longest matching prefix, update pointer *)
        LongestMatch:= node.ResultsPointer + CountOnes(node.internalBitmap,
        treeFunction(node.internalBitmap, stride[i]));
    if (node.externalBitmap[stride[i]] = 0) then (* no extending path through this trie node for this search *)
        NextHop:= Result[LongestMatch]; (* lazy access of longest match pointer to get next hop pointer *)
        break; (* terminate search)
    else (* there is an extending path, move to child node *)
        node:= node.childPointer + CountOnes(node.externalBitmap, stride[i]);
        i:=i+1; (* move on to next stride *)
end do;
```

TREE BITMAP SEARCH ALGORITHM FOR DESTINATION ADDRESS WHOSE BITS ARE IN AN ARRAY CALLED STRIDE

FIGURE 1D
PRIOR ART

```
For each node S_{k+1} in children_array (S_k) {
    if ( S_{k+1} is not an element of Set_{k+1}) {
        if (bestleaf_offset (S_{k+1}) < New_leaf_array_offset (P_k) ) {
            /* In this case the new prefix is inserted at a higher offset and hence
             * the existing offset is not affected, just update the base */
            parent_best_leaf(S_{k+1}) = New_leaf_array_base(P_k) +bestleaf_offset(S_{k+1})
        }
        else {
            bestleaf_offset (S_{k+1}) += 1
            parent_best_leaf(S_{k+1}) = New_leaf_array_base(P_k) +bestleaf_offset(S_{k+1})
        }
    }
    else if (S_{k+1} is an element of Set_{k+1}) {
        if (bestleaf_length (S_{k+1}) > prefix_length (P_k) {
            /* In this case there is a prefix longer than P_k in search node S_k */
            /* So, offset of that prefix in the leaf array would have increased
             * by one after P_k is inserted */
            bestleaf_offset (S_{k+1}) += 1
            parent_best_leaf(S_{k+1}) = New_leaf_array_base(P_k) +bestleaf_offset(S_{k+1})
        }
        else {
            /* P_k is now the longest matching prefix for S_{k+1} */
            bestleaf_offset (S_{k+1}) = New_leaf_array_offset (P_k)
            parent_best_leaf(S_{k+1}) = New_leaf_array_base(P_k) +bestleaf_offset(S_{k+1})
            bestleaf_length (S_{k+1}) = prefix_length (P_k)
        }
    }
}
```

FIGURE 3B

```
For each node S_{k+1} in children_array (S_k) {
    if ( S_{k+1} is not an element of Set_{k+1}) {
        if (bestleaf_offset (S_{k+1}) < Old_leaf_array_offset (P_k) ) {
            /* In this case the new prefix is inserted at a higher offset and hence
             * the existing offset is not affected, just update the base */
            parent_best_leaf(S_{k+1}) = New_leaf_array_base(P_k) +bestleaf_offset(S_{k+1})
        }
        else {
            bestleaf_offset (S_{k+1}) = bestleaf_offset (S_{k+1}) - 1
            parent_best_leaf(S_{k+1}) = New_leaf_array_base(P_k) +bestleaf_offset(S_{k+1})
        }
    }
    else if (S_{k+1} is an element of Set_{k+1}) {
        Parse the Internal Bitmap in I_k to find the new best leaf corresponding to S_{k+1}
        Offset(New_Best_Leaf) = the offset of the new best leaf in it's leaf array.
        If there is no such best leaf, then
            parent_best_leaf(S_{k+1}) = 0
        else
            parent_best_leaf(S_{k+1}) = New_leaf_array_base(P_k)
                +Offset(New_Best_Leaf)
    }
}
```

FIGURE 3C

METHOD AND APPARATUS FOR GENERATING AND USING ENHANCED TREE BITMAP DATA STRUCTURES IN DETERMINING A LONGEST PREFIX MATCH

FIELD OF THE INVENTION

This invention especially relates to communications and computer systems; and more particularly, the invention relates, but is not limited to generating and using enhanced tree bitmap data structures in determining a longest prefix match, such as in a router, packet switching system, or other communications or computer system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

IP forwarding requires a longest matching prefix computation at wire speeds. The current IP version, IPv4, uses 32 bit destination addresses and a core Internet router can have over 200,000 prefixes. A prefix is typically denoted by a bit string (e.g., 01*) followed by a '*' to indicate the value of these trailing bits does not matter. For destination routing, each prefix entry in a routing table typically consists of a prefix and a next hop value. For example, suppose the database consists of only two prefix entries (01*→L1; 0100*→L2). If the router receives a packet with destination address that starts with 01000, the address matches both the first prefix (01*) and the second prefix (0100*). Because the second prefix is the longest match, the packet should be sent to next hop L2. On the other hand, a packet with destination address that starts with 01010 should be sent to next hop L1. The next hop information will typically specify an output port on the router and possibly a data link address.

FIG. 1A illustrates an example of a set of prefixes P1-9 shown as nodes 1A-9A in table 10A and as nodes 1B-9B in unibit trie 10B. Also shown in unibit trie 10B are placeholder/vacant nodes 11B-18B, which represent non-matching nodes (i.e., nodes that are not possible results as a longest matching prefix.) For example, a string of 1110000 matches prefixes P1 (1B), P2 (2B) and P5 (5B), with the longest matching prefix being P5 (B5).

One known approach is typically referred to as "tree bitmap", described in Eatherton et al., "Data Structure Using a Tree Bitmap and Method for Rapid Classification of Data in a Database," U.S. patent application Ser. No. 09/371,907, filed Aug. 10, 1999, currently pending, which is hereby incorporated by reference. Tree bitmap is a multibit trie algorithm that implements a representation of the trie by grouping nodes into sets of strides. A stride is typically defined as the number of tree levels of the binary trie that are grouped together or as the number of levels in a tree accessed in a single read operation representing multiple levels in a tree or trie. FIG. 1B illustrates one such partitioning of nodes P1-P9 (1B-9B) and vacant nodes 11B-18B (FIG. 1A) into strides 20-25. In this example, the stride is of size three.

In a known implementation of the tree bitmap algorithm, all child nodes of a given trie node are stored contiguously, which allows the use of just one pointer for all children (the pointer points to the start of the child node block), as each child node can be calculated as an offset from the single pointer. This can reduce the number of required pointers and cuts down the size of trie nodes.

In addition, there are two bit maps per trie node, one for all the internally stored prefixes and one for the external pointers. The internal bit map has a 1 bit set for every prefixes stored within this node. Thus, for an r-bit trie node, there are $(2^r)-1$ possible prefixes of lengths less than r, and hence, a $(2^r)-1$ bit map is used. The external bit map contains a bit for all possible $2^r$ child pointers. A trie node is of fixed size and only contains an external pointer bit map, an internal next hop information bit map, and a single pointer to the block of child nodes. The next hops associated with the internal prefixes are stored within each trie node in a separate array associated with this trie node. For memory allocation purposes, result arrays are normally an even multiple of the common node size (e.g. with 16-bit next hop pointers, and 8-byte nodes, one result node is needed for up to four next hop pointers, two result nodes are needed for up to 8, etc.) Putting next hop pointers in a separate result array potentially requires two memory accesses per trie node (one for the trie node and one to fetch the result node for stored prefixes). A simple lazy strategy to not access the result nodes till the search terminates is typically used. The result node corresponding to the last trie node encountered in the path that contained a valid prefix is then accessed. This adds only a single memory reference at the end besides the one memory reference required per trie node.

FIG. 1C illustrates one representation of a tree bitmap implementation of the prefix example shown in FIGS. 1A-B. As shown, root node 30 represents the first level trie. Child pointer 31 connects root node 30 to child array 40 containing the second level strides. In level 3, there are two child arrays 50 and 60, which are connected from child array 40 respectively by child pointers 41 and 42.

A longest prefix match is found by starting with the root node. The first bits of the destination address (corresponding to the stride of the root node, three in this example) are used to index into the external bit map at the root node at say position P. If a 1 is located in this position, then there is a valid child pointer. The number of 1's not including and to the left of this 1 (say I) is determined. Because the pointer to the start position of the child block (say C) is known and the size of each trie node (say S), the pointer to the child node can be computed as C+(I*S).

Before moving on to the child, the internal bit map is checked to see if there is a stored prefix corresponding to position P. To do so, imagine successively remove bits of P starting from the right and index into the corresponding position of the internal bit map looking for the first 1 encountered. For example, suppose P is 101 and a three bit stride is used at the root node bit map. The right most bit is first removed which results in the prefix 10*. Because 10* corresponds to the sixth bit position in the internal bit map, a check is made to determine if there is a 1 in that position. If not, the right most two bits (resulting in the prefix 1*) are removed. Because 1* corresponds to the third position in the internal bit map, a check is made to determine if a 1 is there. If a 1 is found there, then the search ends. If a 1 is not found there, then the first three bits are removed and a search is performed for the entry corresponding to * in the first entry of the internal bit map.

Once it has been determined that a matching stored prefix exists within a trie node, the information corresponding to the next hop from the result node associated with the trie node is not immediately retrieved. Rather, the number of bits before the prefix position is counted to indicate its position in the result array. Accessing the result array would take an extra memory reference per trie node. Instead, the child node is examined while remembering the stored prefix position and the corresponding parent trie node. The intent is to remember the last trie node T in the search path that contained a stored prefix, and the corresponding prefix position. When the search terminates (i.e., a trie node with a 0 set in the corresponding position of the external bit map is encountered), the result array corresponding to T at the position already computed is accessed to read off the next hop information.

FIG. 1D illustrates pseudocode of one implementation of the full tree bitmap search. It assumes a function treeFunction that can find the position of the longest matching prefix, if any, within a given node by consulting the internal bitmap. "LongestMatch" keeps track of a pointer to the longest match seen so far. The loop terminates when there is no child pointer (i.e., no bit set in external bit map of a node) upon which the lazy access of the result node pointed to by LongestMatch is performed to get the final next hop. The pseudocode assumes that the address being searched is already broken into strides and stride[i] contains the bits corresponding to the $i^{th}$ stride.

Keeping the stride constant, one method of reducing the size of each random access is to split the internal and external bitmaps, which is sometimes referred to as split tree bitmaps. This is done by placing only the external bitmap in each trie node. If there is no memory segmentation, the children trie nodes and the internal nodes from the same parent can be placed contiguously in memory. If memory segmentation exists, it is a bad design to have the internal nodes scattered across multiple memory banks. In the case of segmented memory, one option is for a trie node to have pointers to the child array, the internal node, and to the results array.

An alternative, as illustrated in FIG. 1E, has the trie node point at the internal node, and the internal node point at the results array. To make this optimization work, each child must have a bit indicating if the parent node contains a prefix that is a longest match so far. If there was a prefix in the path, the lookup engine records the location of the internal node (calculated from the data structure of the last node) as containing the longest matching prefix thus far. Then, when the search terminates, the corresponding internal node is accessed and then the results node corresponding to the internal node is accessed. Notice that the core algorithm accesses the next hop information lazily; the split tree algorithm accesses even the internal bit map lazily. What makes this work is that any time a prefix P is stored in a node X, all children of X that match P can store a bit saying that the parent has a stored prefix. The software reference implementation uses this optimization to save internal bit map processing; the hardware implementations use it only to reduce the access width size (because bit map processing is not an issue in hardware). A nice benefit of split tree bitmaps is that if a node contained only paths and no internal prefixes, a null internal node pointer can be used and no space will be wasted on the internal bitmap.

With this optimization, the external and internal bitmaps are split between the search node and the internal node respectively. Splitting the bitmaps in this way results in reduced node size which benefits hardware implantations. Each Search node Sj has two pointers—one pointing to the children and the other to the internal node, Ij. The internal node Ij maintains a pointer to the leaf array LAj of leaves corresponding to prefixes that belong to this node. For example, FIG. 1E illustrates search nodes S1 (111), S2 (112) and S3 (113), internal nodes I1 (121), I2 (115) and I3 (114), and leaf arrays LA1 (122), LA2 (116) and LA3 (123), and their interconnection by pointers. Additionally, leaf arrays LA1 (122), LA2 (116) and LA3 (123) respectively include leaf nodes L1 (122A), L2 (116A), and L3 (123A). Note, nodes illustrated in solid lines are the nodes accessed during a tree bitmap lookup example described hereinafter.

Now, consider the case where a lookup proceeds accessing search nodes S1 (111), S2 (112) and S3 (113). If the parent_has_match flag is set in S3 (113), this implies there is some prefix in one of the leaf nodes L2 (116A) in the leaf array LA2 (116) which is the current longest match. In this case, the address of internal node I2 (115) is saved in the lookup context. Now suppose that S3 (113) is not extending paths for this lookup. There could be some prefix in leaf array LA3 (123) which is the longest matching prefix. Hence, I3 (114) is first accessed and its internal bitmap checked for a longest matching prefix. If no longest matching prefix is found, internal node I2 (115), whose address has been saved, is retrieved, its bitmap parsed, and leaf node L2 (116A) corresponding to the longest match is returned. The above access sequence is S1 (111), S2 (112), S3 (113), I3 (114), I2 (115), L2 (116A). This example shows that there are cases where two internal nodes need to be accessed and two internal bitmaps parsed before the longest match can be determined.

In hardware implementations, the memory access speeds are generally the bottleneck as opposed to node processing time. A typical implementation of a hardware based tree bitmap lookup engine uses multiple memory channels to store the tree bitmap data structure. In this case the tree bitmap nodes are spread out across the memory channels in such a way that per lookup, successive nodes accessed fall in different memory channels. If a single memory channel can sustain 'x' accesses per second, then with multiple lookups in progress simultaneously, 'x' lookups per second on average can be achieved provided each memory channel is accessed at most once per lookup. If any of the channels is accessed twice per lookup, then the packet forwarding rate drops by half because that particular channel becomes the bottleneck.

Therefore, all the Internal nodes along any path from root to bottom of the tree need to be stored in different memory channels. Accessing two internal nodes presents a problem when there are a limited number of memory channels as both internal nodes need to be placed in different memory channels, and which two internal nodes are going to be accessed depends on the particular tree bitmap and the particular lookup value. Referring to FIG. 1E, for example, the internal nodes accessed could be I3 (114) and I2 (115), or I3 (114) and I1 (121), or I2 (115) and I1 (121). Therefore, in this example, all seven nodes S1 (111), S2 (112), S3 (113), I1 (121), I2 (115), I3 (114), and L2 (116) need to be in separate memory modules. This is problematic when there are less than seven memory modules.

New methods and apparatus are needed for generating and using enhanced tree bitmap data structures in determining a longest prefix match, especially, but not limited to those methods and apparatus which reduce the number of memory accesses and/or provide an advantage over previous tree bitmap implementations.

SUMMARY OF THE INVENTION

Methods and apparatus are disclosed for generating and using enhanced tree bitmap data structures in determining a longest prefix match, such as in a router, packet switching system, or other communications or computer component, device, or system. One embodiment includes a data structure. The data structure includes a first search node, a first child array having a first internal node and a second search node; and a first leaf array having multiple first leaf array entries. The first search node includes a pointer to the first child array. The first internal node includes a pointer to the first leaf array. The second search node includes a pointer to one of the multiple first leaf array entries.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 1A-E are block diagrams or other illustrations of a known tree bitmap system;

FIGS. 3B-C illustrate pseudo code of processes used in one embodiment to add and delete nodes from a tree bitmap;

DETAILED DESCRIPTION

Figure 1A:
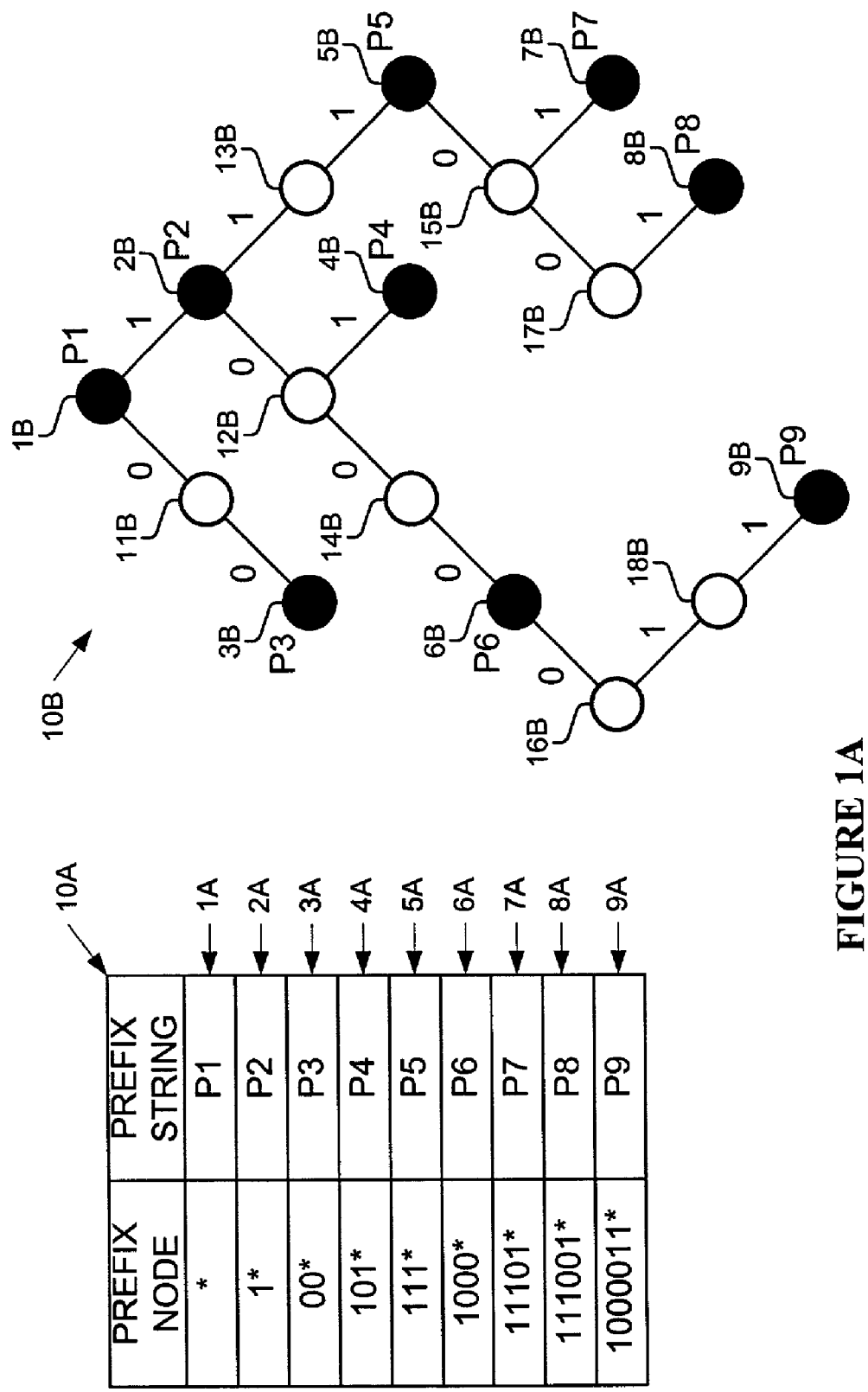
Figure 1B:
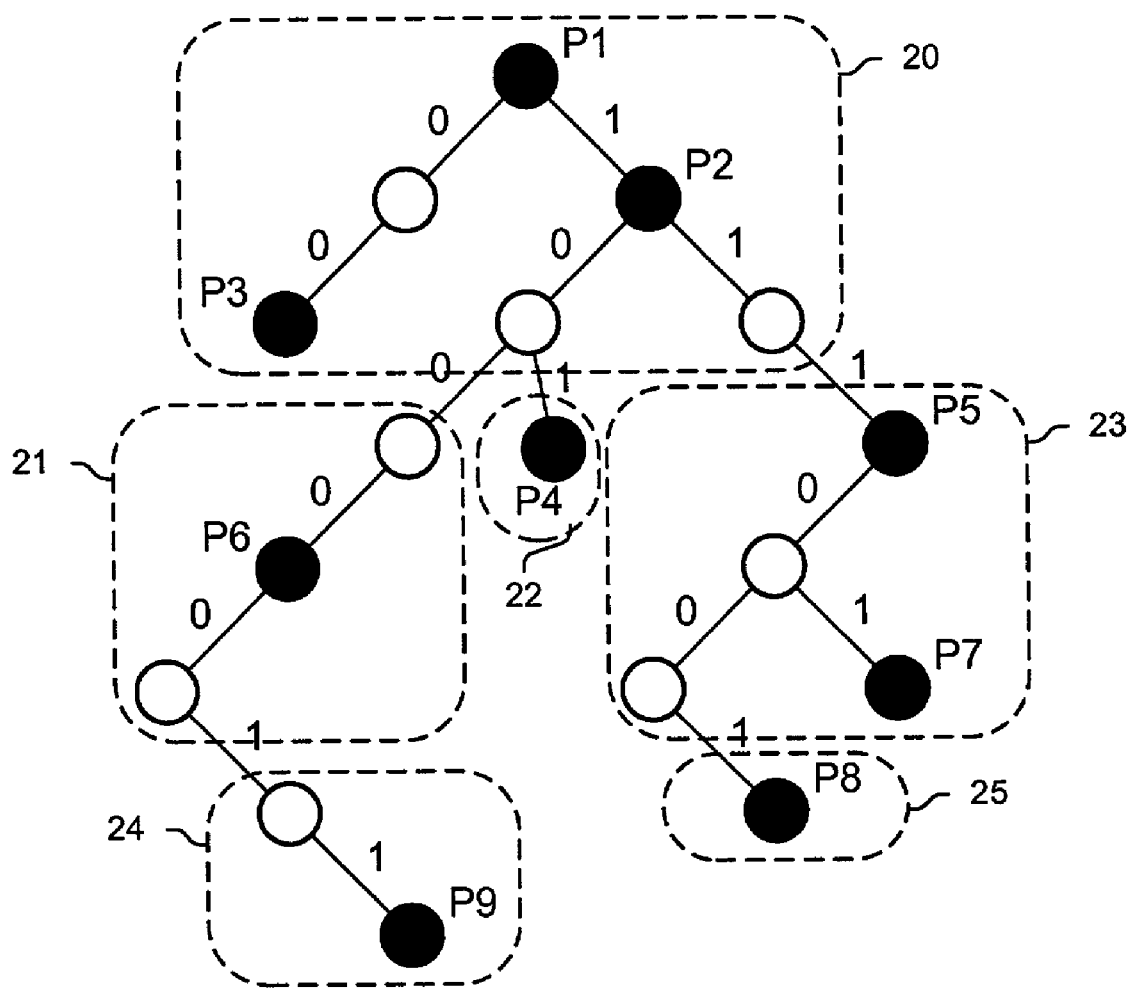
Figure 1C:
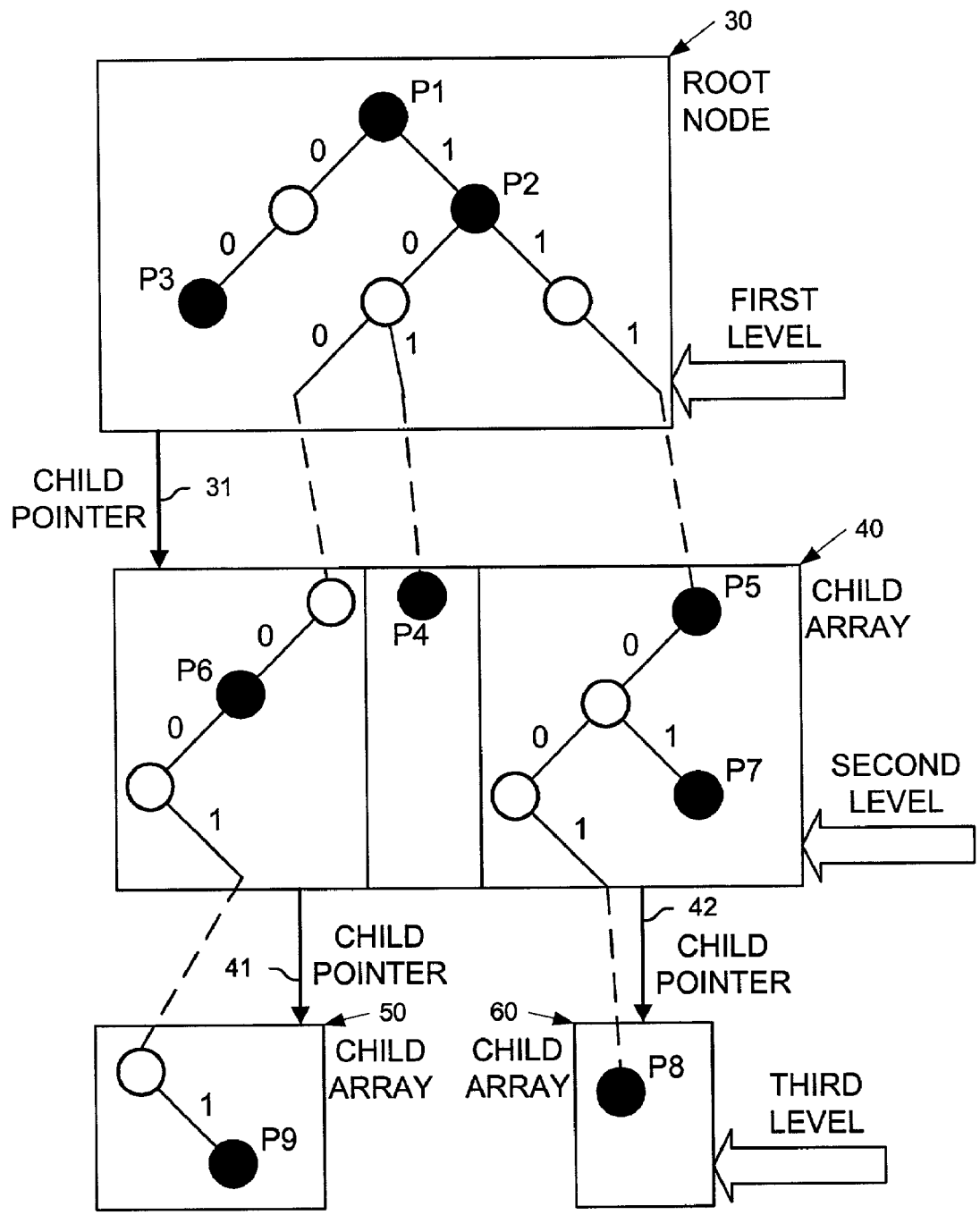

Methods and apparatus are disclosed for generating and using enhanced tree bitmap data structures in determining a longest prefix match, such as in a router, packet switching system, or other communications or computer component, device, or system. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processors and systems, control logic, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed a processor and/or control logic, and data which is manipulated a processor and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The term "associative memory" refers to all types of known or developed associative memories, including, but not limited to binary and ternary content-addressable memories, hash tables, TREE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify an alternative selection of one or more, including all, of the conjunctive items.

Methods and apparatus are disclosed for generating and using an enhanced tree bitmap data structure in determining a longest prefix match, such as in a router, packet switching system. One embodiment organizes the tree bitmap to minimize the number of internal nodes that must be accessed during a lookup operation. A pointer is included in each of the trie or search nodes to the best matching entry in the leaf or results array of the parent, which allows direct access to this result without having to parse a corresponding internal node. Moreover, one embodiment stores the internal node for a particular level as a first element in its child array. Additionally, one embodiment uses a general purpose lookup engine that can traverse multiple tree bitmaps or other data structures simultaneously, and perform complete searches, partial searches, and resume partial searches such as after receiving additional data on which to search.

Figure 1E:
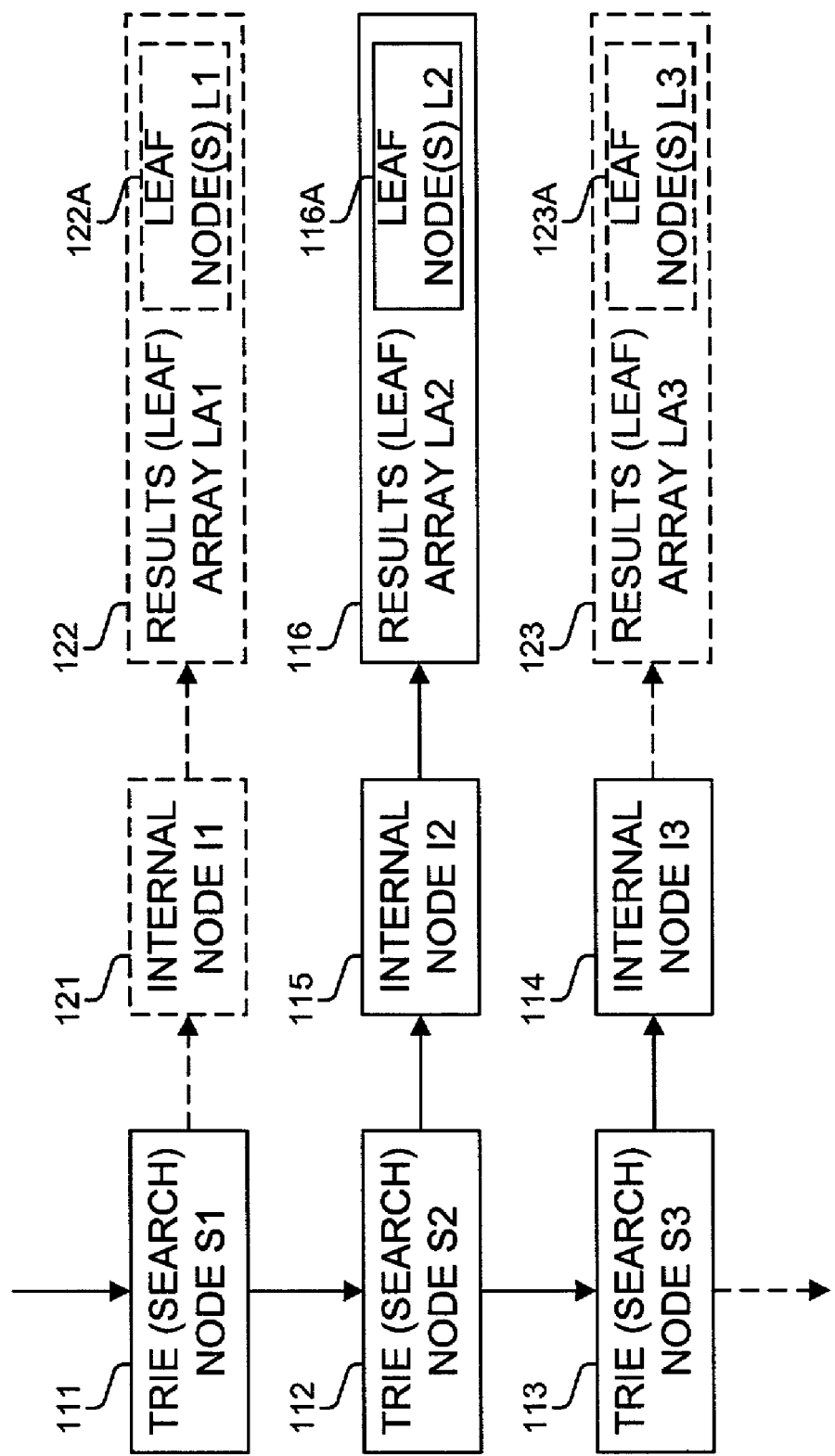

One embodiment includes an enhancement to the tree bitmap data structure and associated lookup and update schemes. These typically improve lookup performance and may save a memory access for certain hardware embodiments. One embodiment organizes the tree bitmap in such a way that at most one internal node access is required per lookup. For example, one embodiment modifies the tree bitmap structure so as to avoid having to access the internal node I2 in the access sequence S1, S2, S3, I3, I2, and L2 (i.e., the sequence previously described in relation to FIG. 1E). In this example and also referring to FIG. 1E, the matching leaf node L2 (116A) is determined after parsing the internal bitmap in I2 (115). An analysis of this access sequence results in the observation that for every lookup which passes through node S3 (113), the subsequent parsing of the internal bitmap I2 (115) always yields the same matching leaf node L2 (116). Thus, in one embodiment, a new tree bitmap data structure and associated lookup and update schemes are used to avoid parsing the internal bitmap in I2 (122) in this exemplary lookup sequence.

One embodiment uses a data structure that includes a first search node, a first child array including a first internal node and a second search node, and a first leaf array including multiple first leaf array entries. Typically, the first search node includes a pointer to the first child array, the first internal node includes a pointer to the first leaf array; and the second search node includes a pointer to one of the multiple first leaf array entries.

In one embodiment, the first internal node is the first element of the first child array. In one embodiment, the pointer of the first internal node and the pointer of the second search node indicate different first leaf array entries. In one embodiment, the data structure further includes a second child array, wherein the second search node includes a pointer to the second child array. In one embodiment, the data structure further includes a second leaf array including multiple second leaf array entries, wherein the second child array includes a second internal node, the second internal node including a pointer to the second leaf array. In one embodiment, the second internal node is the first element of the second child array. In one embodiment, the second child array includes a third search or end node, wherein the second search or end node includes a pointer to one of multiple second leaf array entries. In one embodiment, the pointer of the second internal node and the pointer of the third search or end node indicate different second leaf array entries. In one embodiment, the first search node represents a stride of a first length and the second search node represents of a stride of a second length, wherein the first and second lengths are different. In one embodiment, the first search node includes a first indicator of the first length and the second search node includes a second indicator of the second length.

One embodiment traverses a tree data structure representing multiple prefixes partitioned into multiple strides of a number of tree levels greater than one, each of the multiple strides represented by a tree bitmap and indications of child paths represented by an extending bitmap. In one embodiment, a search node at a current level within the tree data structure is received. A current best match identifier is updated in response to determining if a new best match exists. A current level extending bitmap is indexed into in determining whether or not a matching next level node exists. In one embodiment, this traversal is repeated until a matching next level node does not exist, and then the internal node indicated by the current level search node is retrieved and a search result is identified based on the current best match identifier or based on a pointer in the current level search node to a leaf node. In one embodiment, in response to determining the search node does not exist at the current level, an end node indexed into to identify the search result. In one embodiment, the current best match identifier is updated based on a pointer in the end node.

One embodiment traverses a tree data structure stored in one or more computer-readable mediums based on an input search data string. Typically, a search progression context of a partially completed tree traversal is received, in which the search progression context typically includes a next node address or some other node indicator. The traversal of the tree data structure is resumed from this node a next portion of the input string. One embodiment distributes lookup request that typically includes the next node address to one of multiple memory devices. A lookup result is received from one of the multiple memory devices, the lookup result including a search node. A current best match identifier is updated in response to determining if a new best match exists. A current level extending bitmap of the search node is indexed into to determine whether or not a matching next level node exists. A new value of the next node address is generated, as is a new value for the search progression context.

In one embodiment, the search progression context further includes a best match indication, and a length of input search data string used. In one embodiment, the best match indication includes a match flag and a leaf pointer. In one embodiment, multiple tree data structures are stored in the computer-readable mediums, and these tree data structures can be simultaneously traversed.

One embodiment apparatus for traversing nodes of one or more tree data structures based on an input data string includes a tree bitmap next address mechanism for determining a memory address of a next node of a particular tree data structure of one or more tree data structures, the next node corresponding to a portion of the input data string, multiple memory devices for storing one or more tree data structures and for returning the next node in response to a retrieval request; and a memory manager, coupled to the tree bitmap next address mechanism and the multiple memory devices, for distributing the retrieval request to one of the multiple memory devices. Typically, each of one or more tree data structures includes a first search node, a first child array including a first internal node and a second search node, and a first leaf array including multiple first leaf array entries. In one embodiment, the first search node includes a pointer to the first child array, the first internal node includes a pointer to the first leaf array; and the second search node includes a pointer to one of multiple first leaf array entries.

In one embodiment, one or more tree data structures includes nodes of at least two different trees. In one embodiment, tree bitmap next address further determines one of the multiple memory devices and provides an indication of one of the multiple memory devices to the memory manager. In one embodiment, the next node includes an indication of a particular one of the multiple memory devices, wherein the memory manager distributes the retrieval request to the particular one of the multiple memory devices. In one embodiment, the multiple memory devices includes a first memory device of a first type and a second memory device of a second type, wherein the first and second types are different. In one embodiment, the first memory type stores a first-level node for each of the tree data structures.

Figure 2A:
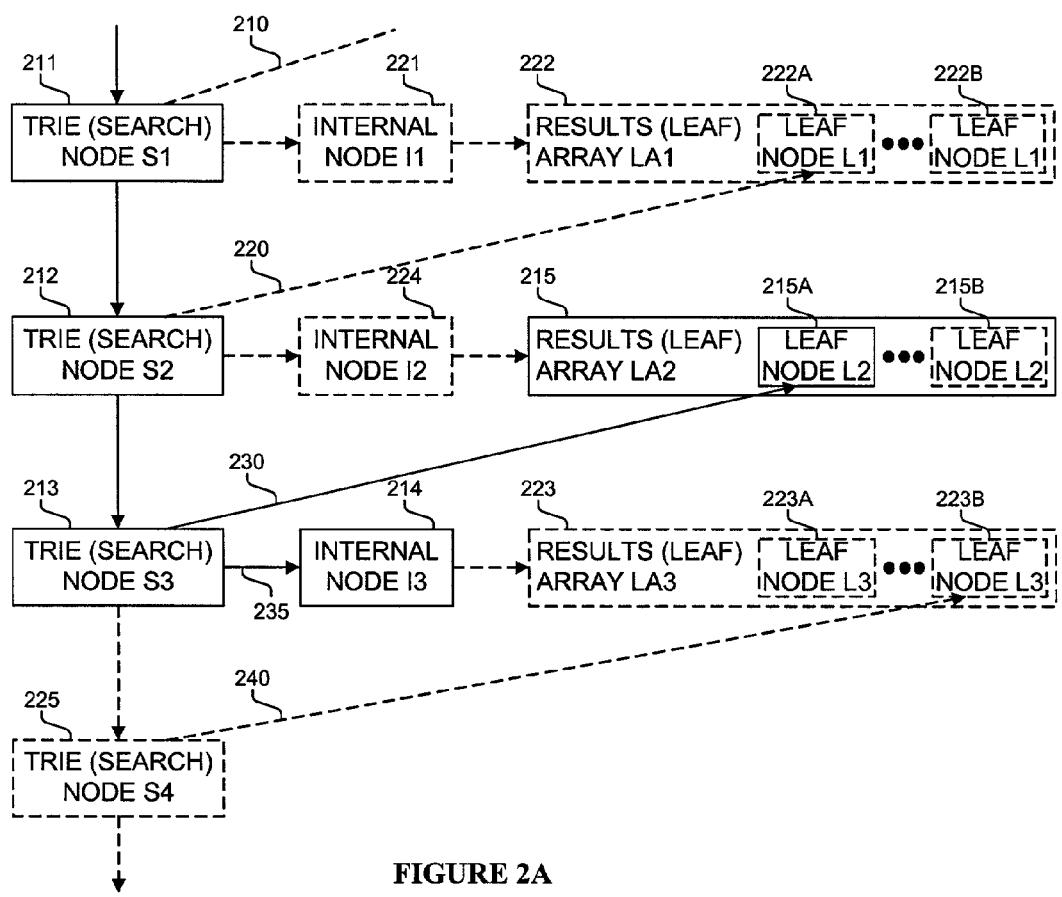
FIG. 2A is a block diagram an enhanced tree bitmap data structure used in one embodiment.

FIG. 2A illustrates one such embodiment with search nodes S1 (211), S2 (212) and S3 (213), internal nodes I1 (221), I2 (224), and I3 (214), and leaf arrays LA1 (222), LA2 (215), LA3 (223), leaf nodes L1 (222A-B), L2 (215A-B), and L3 (223A-B) and their interconnections by pointers. Note, nodes illustrated in solid lines are the nodes accessed during a tree bitmap lookup example described herein after. Also, as shown in FIG. 2A, pointers 220, 230, and 240 point directly from their respective search node 212, 213, and 225 to a parent's leaf node 222A, 215A, and 223B (corresponding the best matching entry). Also, note that FIG. 2A shows only one path, while search nodes of other paths will point to different leaf nodes (222A-B, 215A-B, 223A-B) within the leaf arrays (222, 215, 223). In one embodiment, at control time (e.g., when the tree bitmap is being programmed), it is known that leaf L2 (215A) contains is the longest match corresponding to node S3 (213). So, by directly storing a pointer to leaf node L2 (215A) in node S3 (213), then I2 (224) will not need to be accessed before accessing leaf L2 (215) in the aforementioned access sequence.

In one embodiment, search node S1 (211), S2 (212), S3 (213) and S4 (225) each respectfully include a parent_best_leaf_pointer (210, 220, 230, and 240) to the best matching leaf in their corresponding parent leaf array. Shown are search node S2 (212) having pointer 220 to leaf node L1 (222A) in leaf array LA1 (222), search node S3 (213) having pointer 230 to leaf node L2 (215A) in leaf array LA1 (215), and search node S4 (225) having pointer 240 to leaf node L3 (23B) in leaf array LA3 (223). In one embodiment, a zero or null parent_best_leaf_pointer indicates that there is no updated such longest matching prefix in the parent node.

In certain embodiments, minimizing the size of a node is very important. In one embodiment, space in a search node is reclaimed from prior tree bitmap implementations by freeing up the internal node pointer in a search node and by placing the internal node as the first node in the child array. Then, an internal node can be accessed through a child pointer in the search node, and the freed up internal node pointer space in the node structure of a search node (from a prior implementation) is used to store the pointer to the best matching leaf node in the parent leaf array. Referring to the example, the internal node pointer 235 in S3 (i.e., S3→I3), is replaced with the linkage S3→L2 (230), where L2 is the longest match in level 2 corresponding to S3 (213).

Figure 2B:
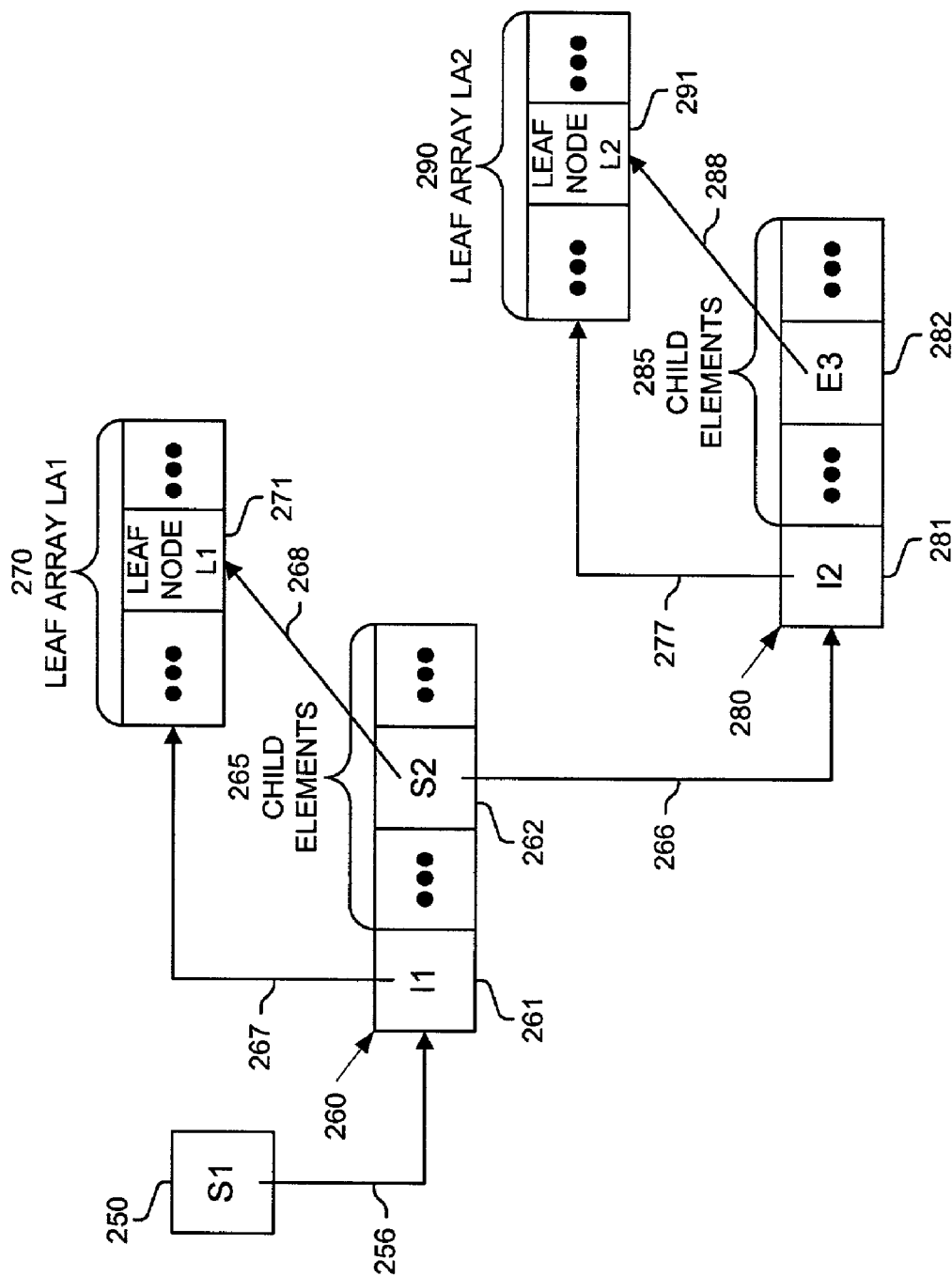
FIG. 2B is a block diagram an enhanced tree bitmap data structure used in one embodiment.

FIG. 2B illustrates one embodiment of a new tree bitmap data structure. As shown, the internal node is placed as the first element in the child array of the search node. Hence the children as well as the internal node are accessed using the same pointer. For example, internal node I1 (261) is the first element of child array 260, and internal node I2 (281) is the first element of child array 280.

In more detail, search node S1 (250) includes a pointer 256 to child array 260, which includes internal node I1 (261) and child elements 265. Internal node I1 (261) includes a pointer 267 to leaf array LA1 (270), which may include zero or more elements, including element leaf node L1 (271), which, in this example, is the best leaf parent result for search node S2 (262). Note, child elements 265 includes search node S2 (262), which includes pointer 268 directly to leaf node L1 271. Note, for ease of reader understanding, a string of dots are used in child elements 265 and in leaf array LA1 (270) to represent more possible search nodes in child elements 265 and pointers to entries in leaf array LA1 (270). Search node S2 (262) also includes pointer 266 to child array 280, which includes internal node I2 (281) and child elements 285, including end node E3 (282). Internal node I2 (281) includes pointer 277 to leaf array LA2 (290). End node E3 (282)

includes pointer 288 directly to leaf node L2 (291), which is the best leaf parent result for end node E3 (282).

Describing one embodiment in generalized terms, the internal node $I_k$ of search node $S_k$ is accessed only if $S_k$ is not extending prefixes for a particular lookup. If $S_k$ is extending prefixes, then $I_k$ never needs to be accessed. In other words, in one embodiment, it is never the case that both $I_k$ and $S_{k+1}$ need to be accessed in the same lookup. Therefore, both $I_k$ and $S_{k+1}$ typically may be placed in the same memory module. In one embodiment, the internal node address $I_k$ is remembered in the lookup, if the 'parent_has_match' flag is set in search node $S_{k+1}$ at the next level. With the new scheme, if 'parent_best_leaf_pointer' in $S_{k+1}$ is non zero, it points directly to the leaf node at level 'k' which is the longest matching prefix. In one embodiment, the above node structure modifications would apply to all tree bitmap nodes except internal nodes and leaf nodes.

Figure 3A:
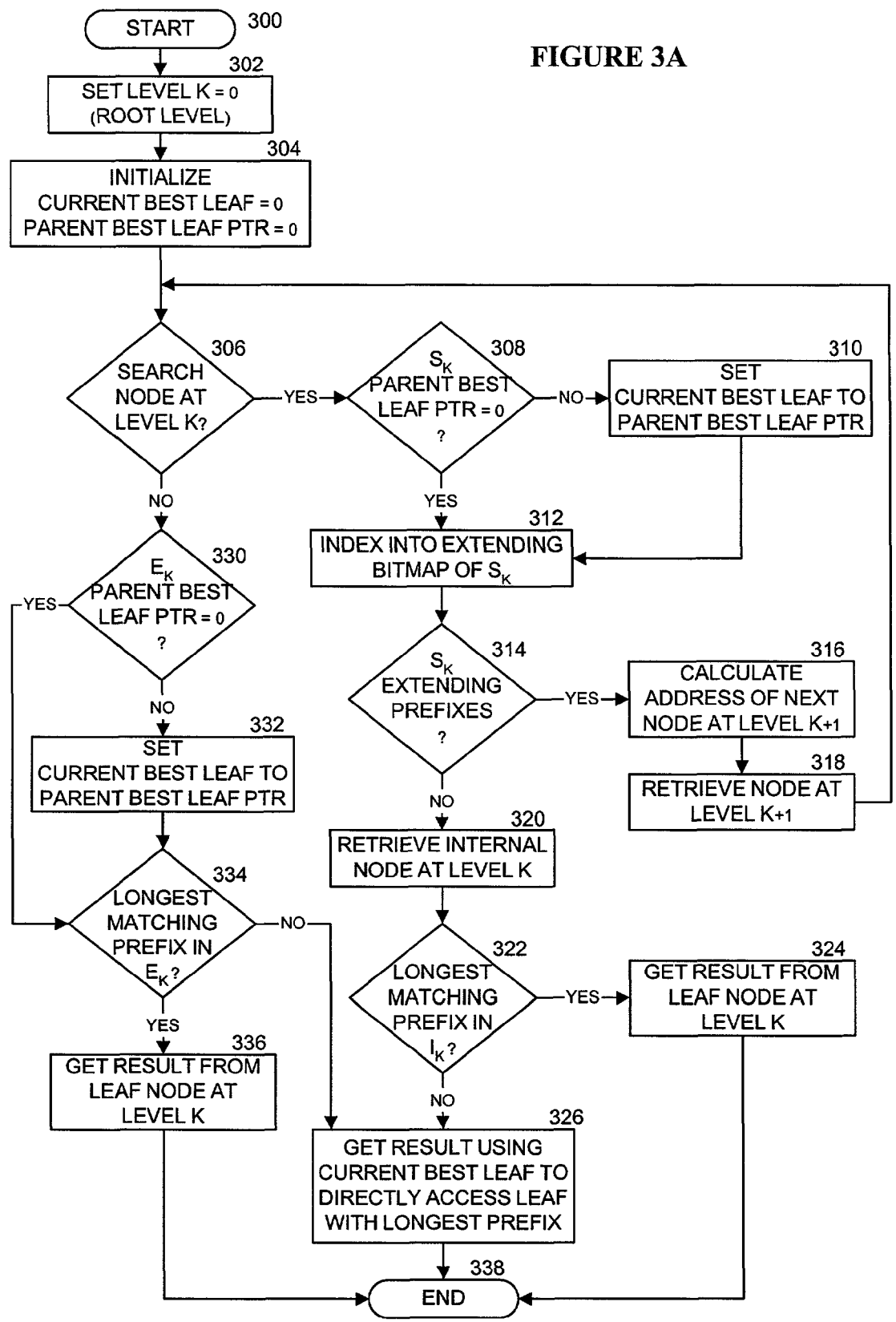
FIG. 3A is a block diagram of a process used in one embodiment to perform a longest prefix matching operation using a tree bitmap.

FIG. 3A illustrates a process used in one embodiment to perform a lookup on a tree bitmap. Processing begins with process block 300, and proceeds to process block 302, wherein the search starts with the root node at level k=0. Next, in process block 304, the current_best_leaf is initialized to zero=0 (e.g., no match so far) and the parent_best_leaf_pointer is initialized to zero=0 (e.g., no match so far.)

Next, as determined in process block 306, if the current node is a search node $S_k$ (e.g., not an end node $E_k$), then as determined in process block 308, if the parent_best_leaf_pointer in $S_k$ is non-zero, then in process block 310, the current_best_leaf is set to the value of parent_best_leaf_pointer.

Next, in process block 312, the 'extending bitmap' of $S_k$ is indexed into using the next few bits from the lookup key depending on the stride. If, as determined in process block 314, $S_k$ is extending prefixes, then in process block 316, the address of the next level node is calculated in the children array (typically including an adjustment to account for internal node $I_k$ being the first node in the children array). Next, in process block 318, the node at level k+1 is retrieved, and processing returns to process block 306.

Otherwise, $S_k$ is not extending prefixes (as determined in process block 314), then, in process block 320, the internal node $I_k$ is retrieved, wherein $I_k$ is the first element in the children array of $S_k$. If, as determined in process block 322, there is a longest matching prefix in $I_k$ by parsing the internal bitmap, then, in process block 324, the result is retrieved from the leaf node at level k, and processing is complete as indicated by process block 338. Otherwise, in process block 326, the result is retrieved using the saved current_best_leaf to directly access the leaf corresponding to the longest prefix so far, and processing is complete as indicated by process block 338.

Otherwise, in process block 306, the current node was determined to be an end node, and processing proceeds to process block 330. If, as determined in process block 330, if parent_best_leaf_pointer in $E_k$ is non-zero, then the current_best_leaf is set to the value of parent_best_leaf_pointer in process block 332.

Next, as determined in process block 334, if there is a longest matching prefix in $E_k$, then in process block 336 the result is retrieved from the leaf node at level K, and processing is complete as indicated by process block 338. Otherwise, in process block 326, the result is retrieved using the saved current_best_leaf to directly access the leaf corresponding to the longest prefix so far, and processing is complete as indicated by process block 338.

FIG. 3B illustrates a process used in one embodiment to update the parent_best_leaf_pointers when inserting prefixes into a tree bitmap data structure when a leaf node is added. Let $P_k$ be the prefix inserted at level k. Let $S_k$ be the corresponding search node. Let $Set_{k+1}$ be the set of those nodes in the child array of $S_k$ which are the descendents of $P_k$. In other words, $P_k$ is a prefix of all search nodes in $Set_{k+1}$. In one embodiment, $Set_{k+1}$ is the set of all nodes in which the 'parent_has_match' flag need to be set when $P_k$ is inserted.

In one embodiment in software, the following additional variables are maintained along with the 'parent_best_leaf_pointer' in each search node. Note, in one embodiment, these are required only in the control software node structure and not in the hardware structure. The bestleaf_offset($S_{k+1}$) is basically the offset of the leaf pointed to by parent_best_leaf ($S_{k+1}$) in its leaf array. The 'bestleaf_length' is the length of the prefix pointed to by parent_best_leaf ($S_{k+1}$).

The following are the definitions of terms/functions/variables used in the pseudo code illustrated in FIG. 3B. Children_array($S_k$) is the child array pointer of search node $S_k$. Bestleaf_offset($S_{k+1}$) is the value of the software only 'bestleaf_offset' variable of search node $S_{k+1}$. Parent_best_leaf($S_{k+1}$) is the value of the newly introduced 'parent_best_leaf_pointer' in search node $S_{k+1}$. Bestleaf_length($S_{k+1}$) is the value of the software only 'bestleaf_length' variable of search node $S_{k+1}$. New_leaf_array_base($P_k$) is the address of the location in the tree bitmap, when a new prefix is inserted in an existing leaf array, to which the entire leaf array along with the inserted prefix $P_k$ is copied.

Basically, as described in the pseudo code illustrated in FIG. 3B, the actual insertion of the prefix proceeds same as prior implementations, with the addition of updating the parent_best_leaf_pointers in the next level search nodes, instead of updating the parent_has_match flag. For a tree bitmap data structure that is in a consistent state with all parent_best_leaf_pointers pointing to the correct leaves, the pseudo code illustrated in FIG. 3B shows how all the parent_best_leaf_pointers are again brought to a consistent state after a prefix insert.

In addition, when a new search node $S_{k+1}$ is inserted into the child array of $S_k$ (e.g., when new branches of the tree are created as a result of Prefix Insert), the parent_best_leaf($S_{k+1}$) needs to be determined. Essentially, the offset of the leaf node in the leaf array $L_k$ of $S_k$ which is the longest prefix corresponding to $S_{k+1}$ is determined by parsing the internal bitmap in the internal node $I_k$ of $S_k$.

In addition, the parent_best_leaf_pointers must be updated when a prefix is deleted. Let $P_k$ be the prefix being deleted at level k. Let $S_k$ be the corresponding search node. Let $Set_{k+1}$ be the set of those nodes in the child array of $S_k$ for whom $P_k$ is the best leaf. FIG. 3C illustrates a process used in one embodiment to update the parent_best_leaf_pointers in the child nodes of the search node from which the prefix is deleted.

Figure 4:
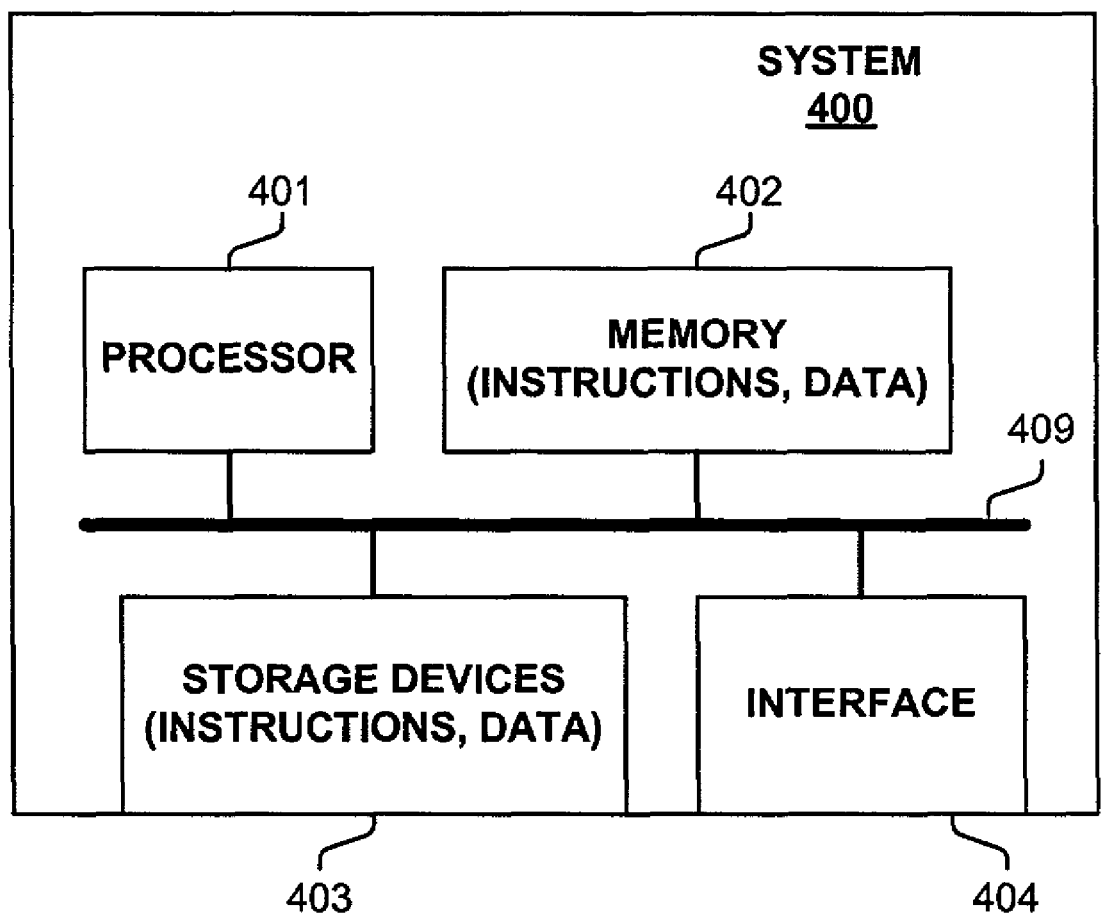
FIG. 4 is a block diagram of one embodiments generating and/or using a tree bitmap data structure to determine a longest prefix match.

FIG. 4 illustrates one embodiment of a system 400 such as, but not limited to a computer or communications system, for implementing a tree bitmap data structure. In one embodiment, system 400 uses such a tree bitmap data structure for determining longest prefix matches according to the invention. In one embodiment, system 400 programs another device, such as traversing engine 500 (FIG. 5), via interface 404 with a tree bitmap data structure.

In one embodiment, system 400 includes a processor 401, memory 402, storage devices 403, and optionally interface 404, which are typically coupled via one or more communications mechanisms 409 (shown as a bus for illustrative purposes.) Various embodiments of system 400 may include more or less elements. The operation of system 400 is typically controlled by processor 401 using memory 402 and storage devices 403 to perform one or more scheduling tasks or processes. Memory 402 is one type of computer-readable medium, and typically comprises random access memory (RAM), read only memory (ROM), flash memory, integrated circuits, and/or other memory components. Memory 402 typically stores computer-executable instructions to be executed by processor 401 and/or data which is manipulated by processor 401 for implementing functionality in accordance with the invention. Storage devices 403 are another type of computer-readable medium, and typically comprise solid state storage media, disk drives, diskettes, networked services, tape drives, and other storage devices. Storage devices 403 typically store computer-executable instructions to be executed by processor 401 and/or data which is manipulated by processor 401 for implementing functionality in accordance with the invention.

Figure 5:
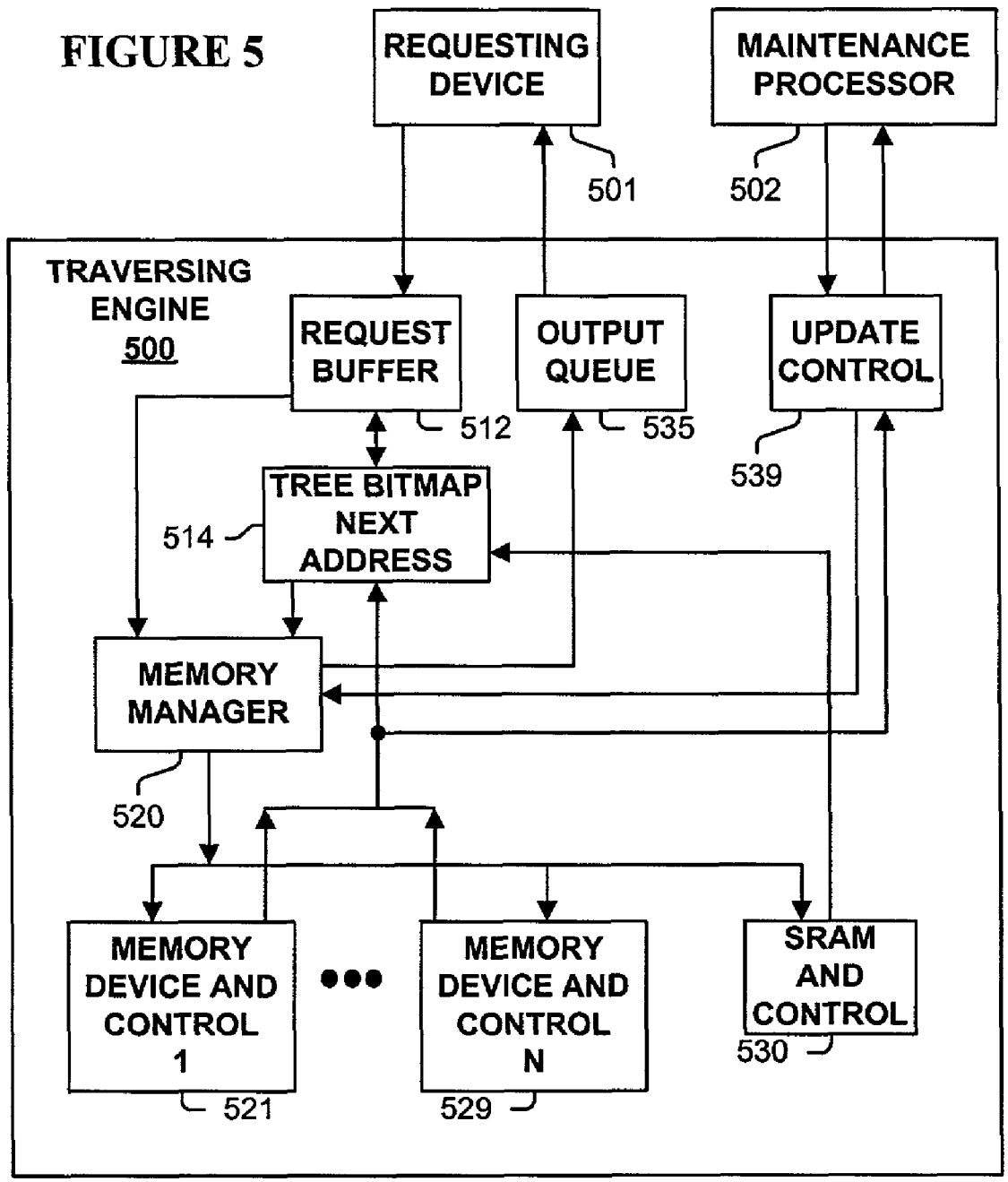
FIG. 5 is a block diagram of one embodiments generating and/or using a tree bitmap data structure to determine a longest prefix match.

FIG. 5 illustrates a block diagram of one embodiment for traversing a hierarchal data structure, including, but not limited to a tree bitmap or other tree data structure. A requesting device 501, such as a processor or other control logic, generates lookup requests that are received by traversing engine 500, and stores them in request buffer 512. Maintenance processor 502 programs traversing engine 500 with one or more tree bitmap and/or other data structures, as traversing engine can simultaneously be used to perform searches on multiple and even independent tree bitmap and/or other data structures. In one embodiment, requesting device 501 and/or maintenance processor correspond to system 400 (FIG. 4). In one embodiment, requesting device 501 and/or maintenance processor 502 are included in traversing engine 500.

In one embodiment, traversing engine 500 includes a request buffer 512 to receive and buffer search requests, a memory manager 520 to control read and write operations to memory device and control 521-529 and to SRAM and control 530, with results being directed to tree bitmap next address logic 514 or output queue 535. Output queue 535 communicates search results to requesting device 501. Tree bitmap next address logic 514 processes search requests received from request buffer 512 and intermediate results received from memory devices and controls 521-529 and from SRAM and control 530, and possibly determines the memory address of the next node and forwards the memory read request to memory manager 520.

Search requests received or generated by traversing engine 500 may include a full or partial string based on which to find a longest matching prefix or other result. For example, in one embodiment, traversing engine 500 includes the ability to search based on a first portion of a lookup string, return a result, and then continue the search from where it left off based on the result and an additional portion of the lookup string. In addition, in one embodiment, traversing engine 500 will continue to search through the data structure until a result is received, search data is exhausted, or a stop node (described further hereinafter) is encountered.

Figure 6A:
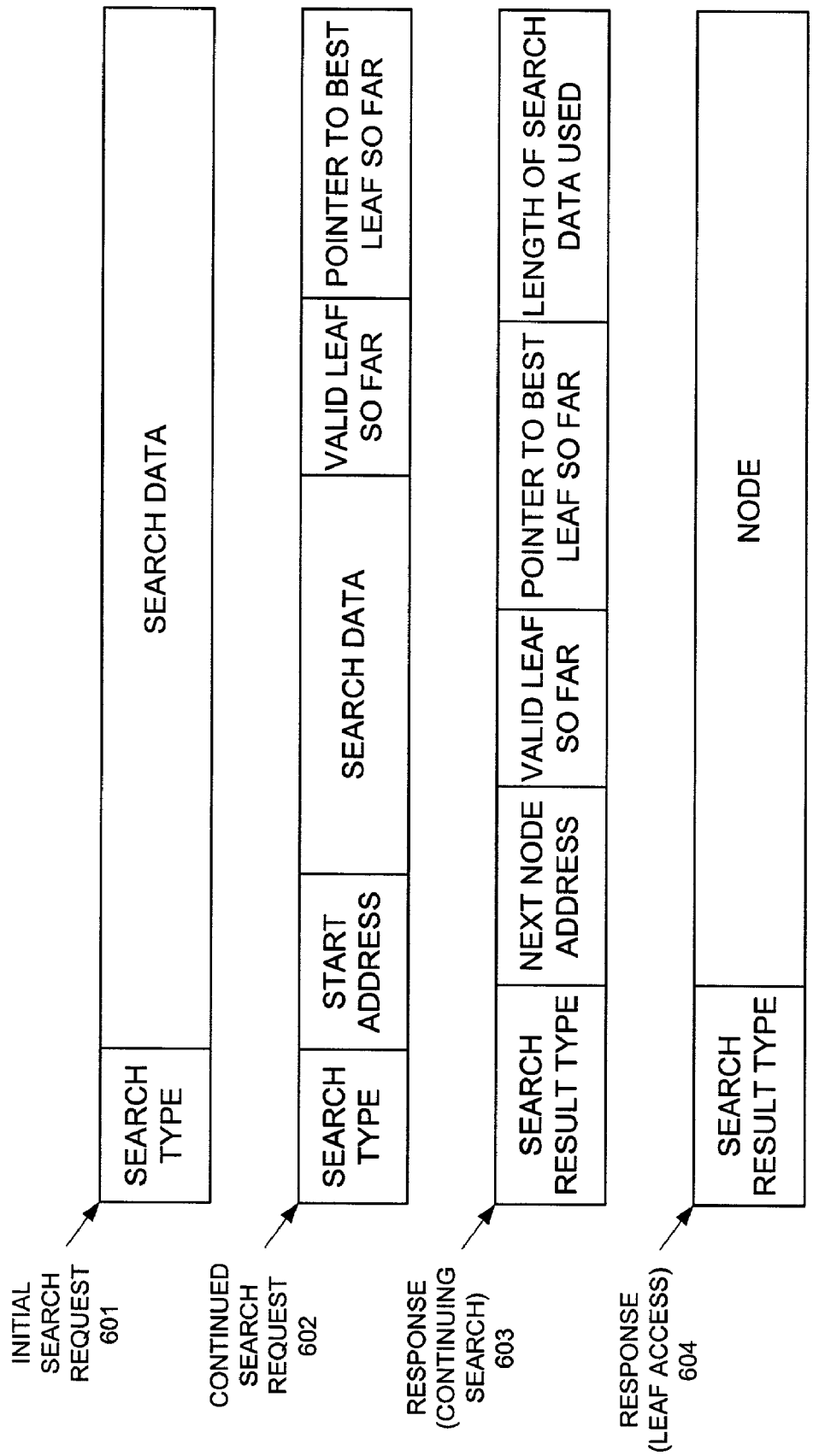
FIG. 6A illustrates search request and result message formats used in one embodiment.

Formats used in one embodiment of a search request are shown in FIG. 6A. Initial search request 601 includes a search type field indicating an initial (versus a continued) search request and a search data field including the information on which to match. Continued search request 602 includes a search type field indicating a continued search, a start address field indicating from where to resume the search, a search data field including an additional portion of the lookup string, a valid leaf so far flag and pointer to best leaf so far field, where this flag indicates whether pointer to best leaf so far field is populated with the corresponding pointer (determined during a previous portion of the search.)

FIG. 6A additionally illustrates formats used in one embodiment of a search response. Response (continuing search) result 603 includes a search result type field, a next node address field, a valid leaf so far flag, a pointer to best leaf so far field, and a length of search data used field. Response (leaf access) result 604 includes a search result type field, and the resulting leaf node data field.

One or more tree bitmap or other data structures are loaded into and can be retrieved by maintenance processor 502 (FIG. 5) by submitting requests to update control 539, which sends update requests to memory manager 520, and can receive information from memory devices and controls 521-529 and from SRAM and control 530.

Figure 6B:
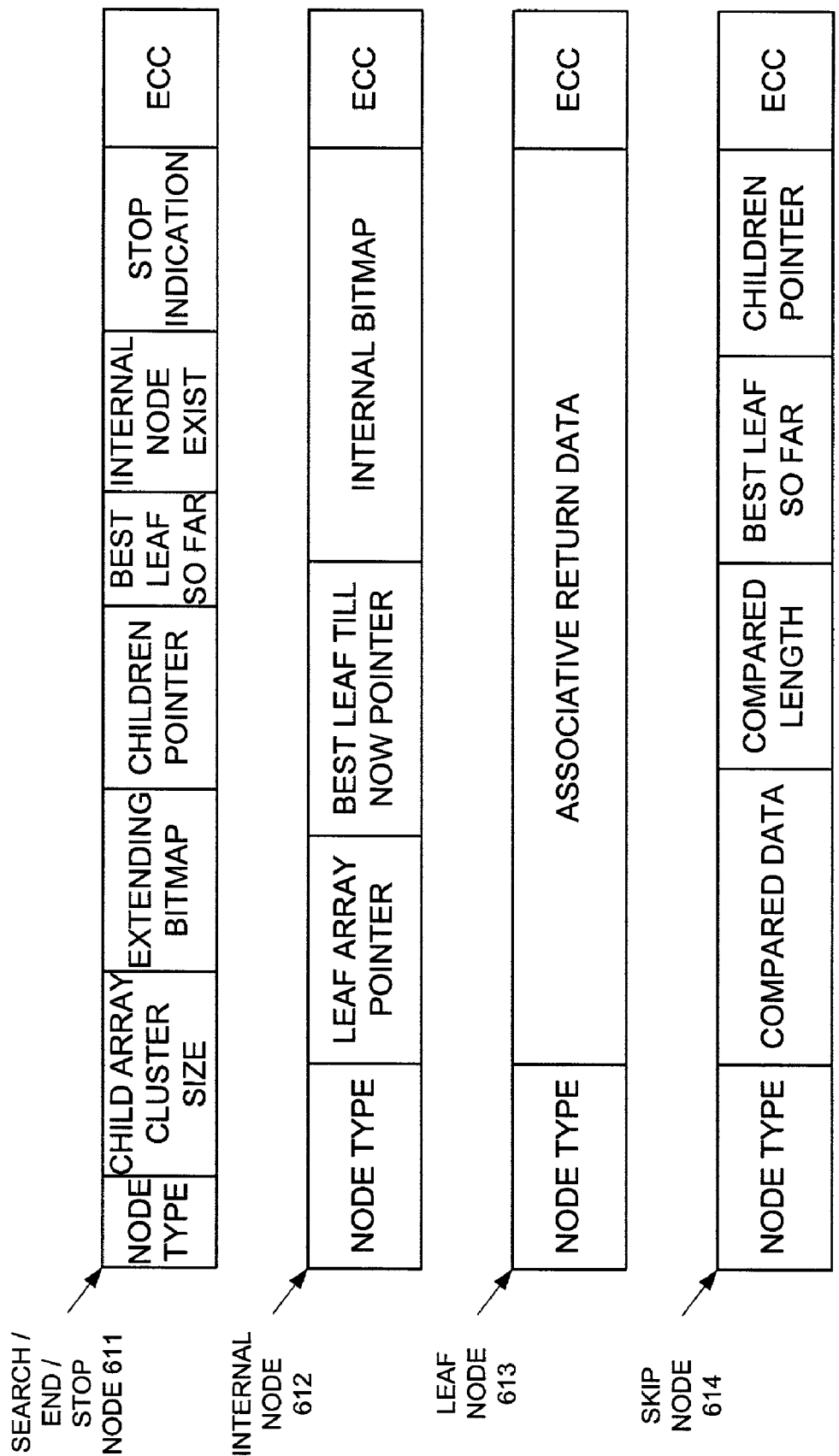
FIG. 6B illustrates one format of node data elements used in one embodiment.

FIG. 6B illustrates the format of nodes or data structure elements used in one embodiment. Search/end/stop node 611 includes a node type field, a child array cluster size which indicated a stride size used in the current node, thus data structure can use variable lengths strides and nodes. Search/end/stop node 611 further includes the extending bitmap, children (e.g., child arrays) pointer field, best leaf so far pointer, internal node exist flag, and an error correcting code field. Internal node 612 includes a node type field, leaf array pointer field, best leaf till now pointer field, internal bitmap field, and error correcting code field. Leaf node 613 includes a node type field, an associative return data field, and an error correcting code field. Skip node 614 includes a node type field, compared data field, compared length field, best leaf so far field, children (e.g., child arrays) pointer field, and an error correcting code field.

Returning to FIG. 5, search requests, such as, but not limited to those described herein, are received by request buffer 512. If the memory address of the node is readily available based on the received search request, the request is forwarded directly to memory manager 520. Otherwise, the request is forwarded to tree bitmap next address logic 514, wherein the memory address is calculated. Note, that tree bitmap next address logic 514 also receives memory read results and calculates the memory address of the next node, or forwards the memory read result (e.g., node) to output queue 535.

Figure 6C:
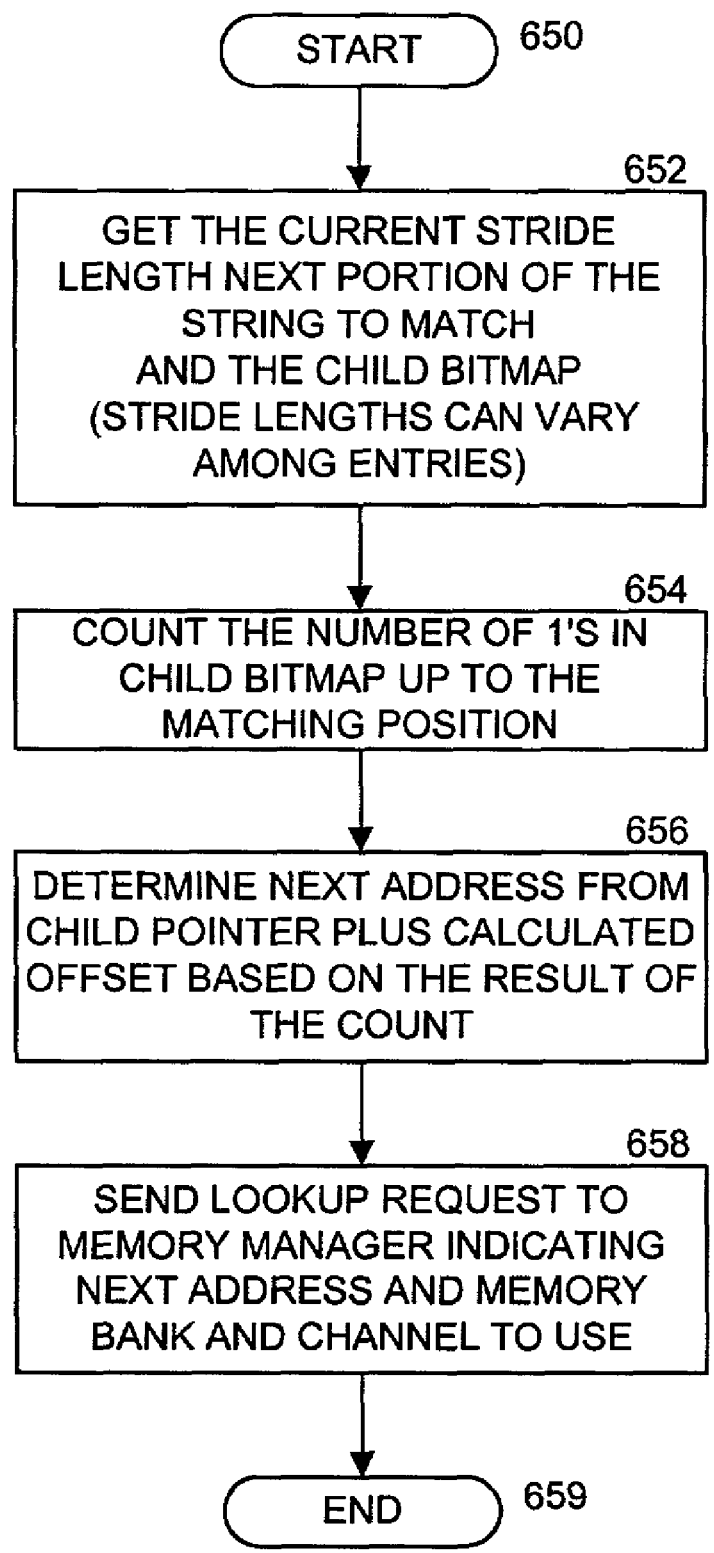
FIG. 6C illustrates a process used in one embodiment to determine an address of a next relevant node or element in one embodiment of a tree bitmap data structure.

FIG. 6C illustrates a process used in one embodiment to calculate or determine the next address (e.g., the address of the relevant next node or element in the data structure.) Processing begins with process block 650, and proceeds to process block 652, wherein the current stride length of the next portion of the lookup string and the child bitmap are retrieved. Note, in one embodiment, the stride length of an entry can vary among each entry. Moreover, one embodiment supports varying sizes of child array, with this size being identified by the child array cluster size. Next, in process block 654, the number of ones in the entry's child bitmap up to the position matching the lookup string are counted. Thus, this count identifies which element is the next one of interest. In process block 656, the next address is calculated based on the child pointer plus the count multiplied by the width of a pointer field. Then, in process block 658, the lookup request including the determined next address, memory bank and channel to use is forwarded to the memory manager, and processing is complete as indicated by process block 659.

The processing by requesting device 501 (FIG. 5) and traversing engine 500 is further described by the flow diagrams illustrated in FIGS. 7, and 8A-D, to which we now turn.

Figure 7:
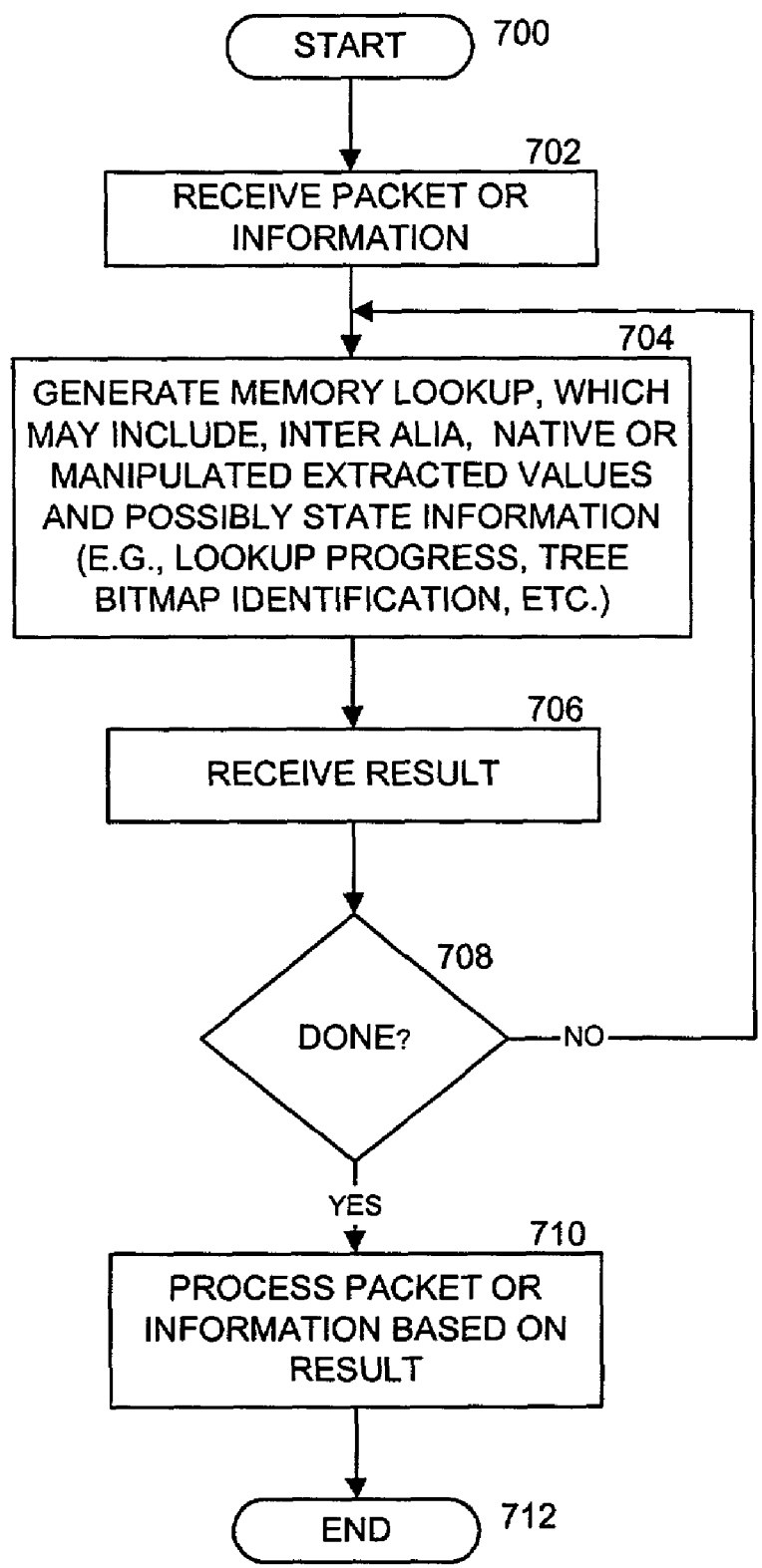
FIG. 7 illustrates a process used in one embodiment to extract data from a received packet or other information, forward such data to a tree bitmap system, and processing the received packet or other information according to a result received from the tree bitmap system.

FIG. 7 illustrates a process used in one embodiment by requesting device 501 (FIG. 5). Processing begins with process block 700, and proceeds to process block 702 wherein a packet or other information is received. Next, in process block 704, a memory search request, such as initial search request 601 (FIG. 6A), is forwarded to traversing engine 500 (FIG. 5). Next, in process block 706, the result is received from traversing engine 500. As determined in process block 708, if the search is not completed (e.g., there are more bits to provide to traversing engine in a search request, such as for a continued search request 602 of FIG. 6A), processing returns to process block 704 to generate and transmit the search request. Otherwise, in process block 710, the packet or other information is processed based on the received result. Processing is complete for this search as indicated by process block 712.

FIGS. 8A-D illustrate a process used in one embodiment to traverse the tree bitmap or other data structure. Processing begins with process block 800, and proceeds to process block 802, wherein the initial or continued search request is received. Next, as determined in process block 804, if the first memory access should be performed in SRAM and control 530, then the SRAM lookup address is determined in process block 806, and the memory access (i.e., lookup) request is forwarded to the SRAM controller for performing the memory access in process block 808. Otherwise, or continuing via connector 8A (811), in process block 810, the lookup request is forwarded to one of the external memory devices based on some distribution scheme for the memory devices available to service the request. In one embodiment, each of the one or more tree bitmap or other data structures is replicated in each of the external memories. In one embodiment, certain of the tree bitmap or other data structures populate a subset of the external memories.

Next, in process block 812, the lookup result is received. If, as determined in process block 814, the lookup result includes a skip node, then processing proceeds via connector 8B (816) to connector 8B (830) in FIG. 8B. Otherwise, if, as determined in process block 818, the lookup result includes an internal node, then processing proceeds via connector 8C (820) to connector 8C (850) in FIG. 8C. Otherwise, if as determined in process block 822, the lookup result includes a leaf node, then in process block 824, the return value of the lookup is sent in process block 824, and processing is complete as indicated by process block 826. Otherwise, processing proceeds to via connector 8D (828) to connector 8D (870) in FIG. 8D.

Figure 8A:
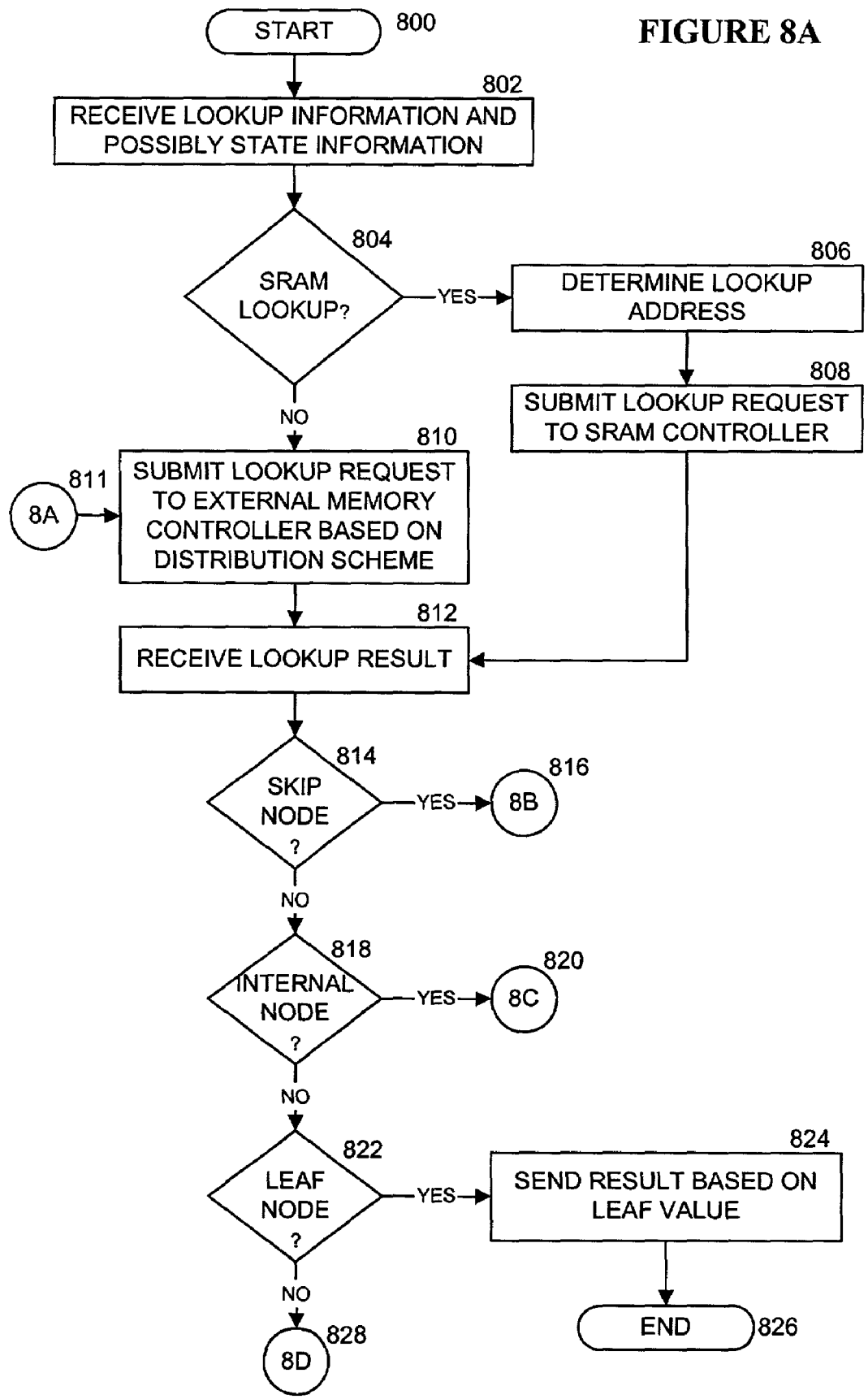
FIGS. 8A-D illustrate processes used in one embodiment to perform a tree bitmap longest prefix or other lookup operation.
Figure 8B:
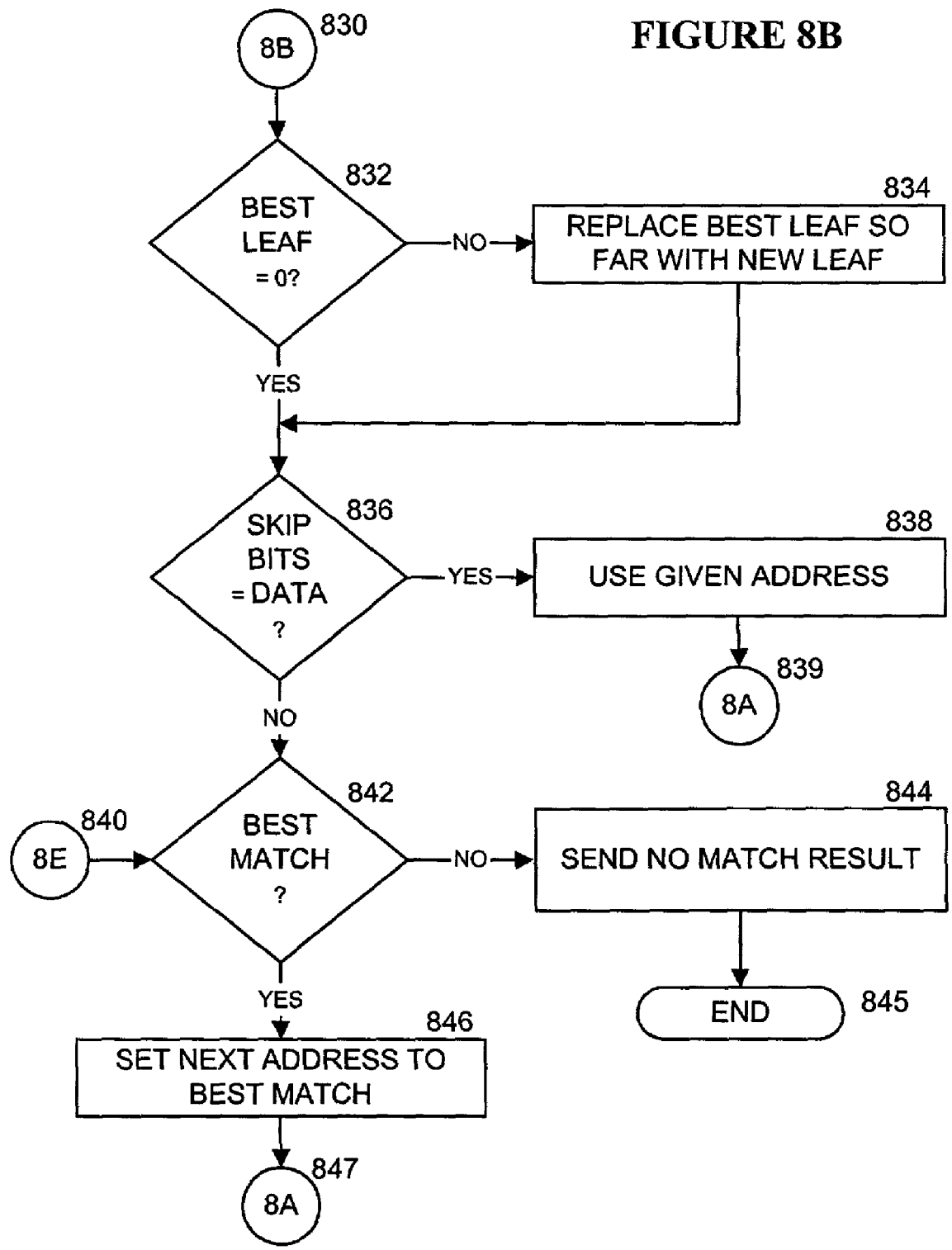

Turning to FIG. 8B, processing continues via connector 8B (830) or 8E (840). Commencing from connector 8B (830), as determined in process block 832, if there is a best leaf corresponding to the current node, then this best leaf is stored as the current best leaf discovered so far in the search in process block 834. Next, as determined in process block 836, the skip bits provided in the skip node match the next data bits of the lookup string, then, in process block 838, the specified address in the skip node is used as the next address value, and processing returns via connector 8A (839) to connector 8A (811) in FIG. 8A. The skip node allows a string of search data to be compared against a programmed string which may correspond to one or more tries, and thus, may be used to save memory accesses and lookup time. This skip node feature is especially useful when there are long strings in the lookup string which do not vary, such as in an IPv6 lookup.

Otherwise, or continuing from connector 8E (840), if a best match has been determined in process block 842, then this best match value is used as the next address, and processing proceeds via connector 8A (847) to connector 8A (811) FIG. 8A. Otherwise, a best match result was not located, and the no match result is sent in process block 844, and processing of this search is completed as indicated by process block 845.

Figure 8C:
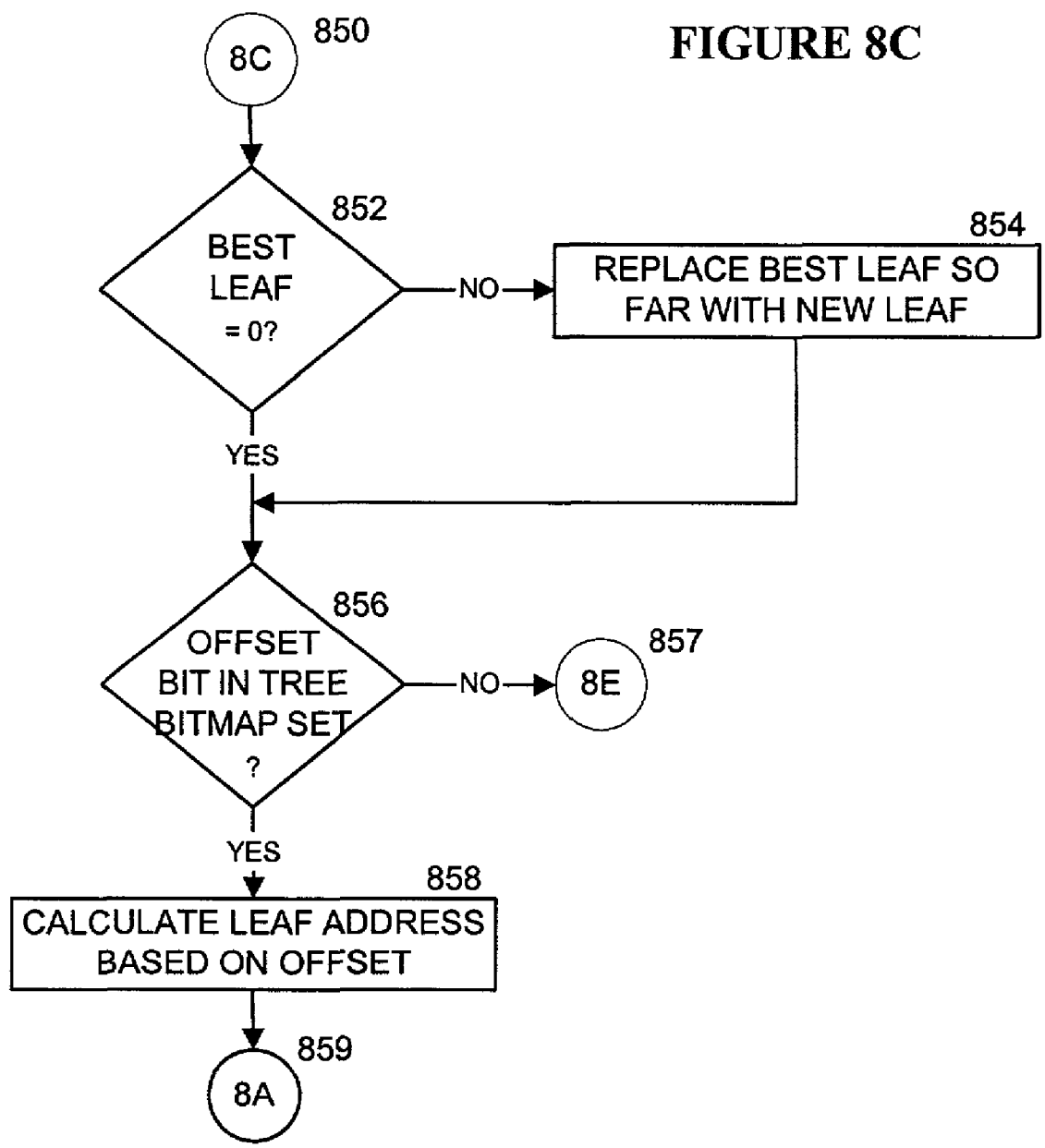

Turning to FIG. 8C, commencing from connector 8C (850), as determined in process block 852, if there is a best leaf corresponding to the current node, then this best leaf is stored as the current best leaf discovered so far in the search in process block 854. Next, as determined in process block 856, if the offset bit flag is set in the tree bitmap (i.e., the tree bitmap is to be parsed), then, in process block 858, the address of the leaf node is calculated in process block 858, and processing proceeds via connector 8A (859) to connector 8A (811) FIG. 8A. Otherwise, processing proceeds via connector 8E (857) to connector 8E (840) in FIG. 8B.

Figure 8D:
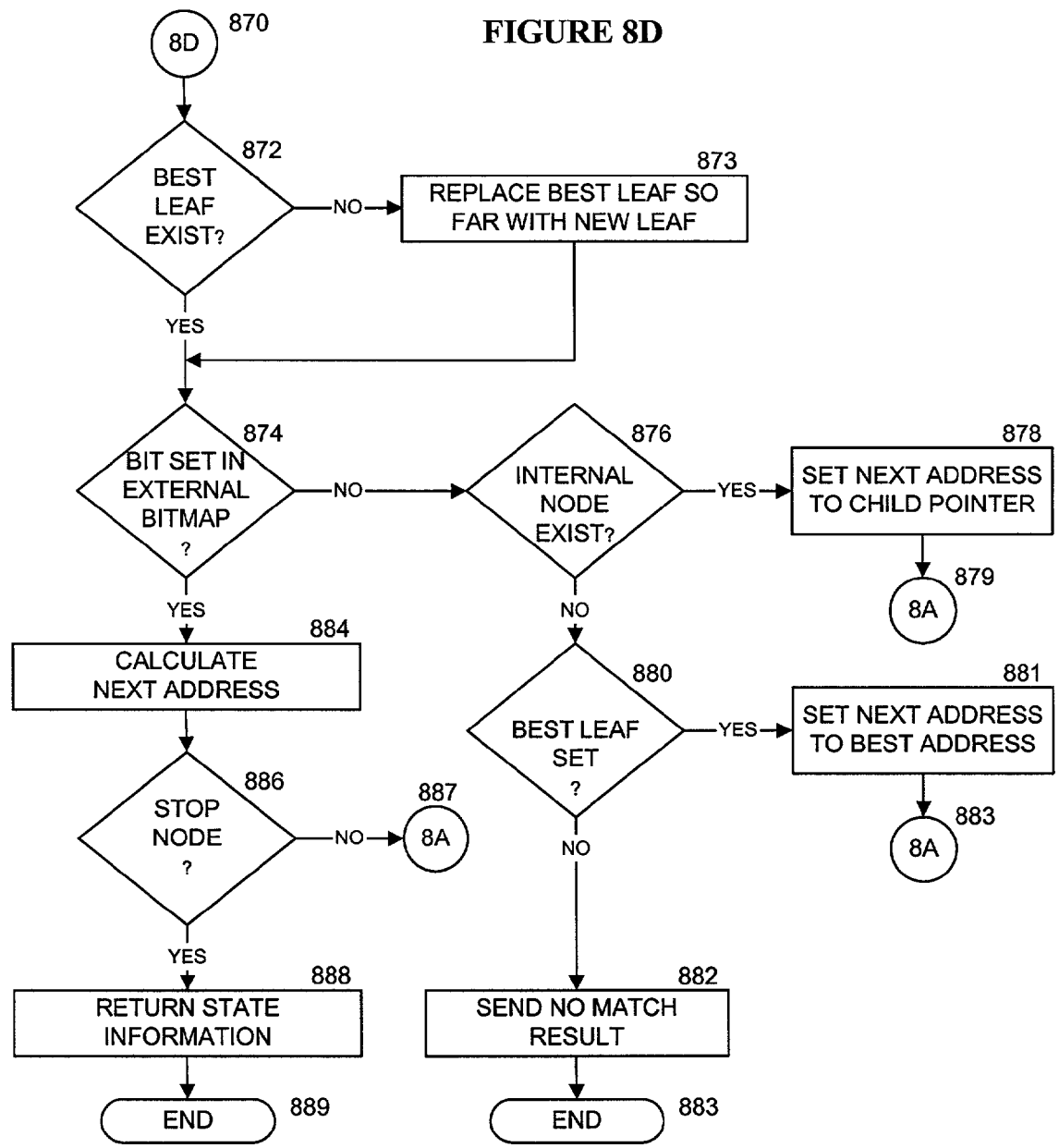

Turning to FIG. 8D, commencing from connector 8D (870), as determined in process block 872, if there is a best leaf corresponding to the current node, then this best leaf is stored as the current best leaf discovered so far in the search in process block 873. Next, as determined in process block 874, if the corresponding bit in the external bitmap is not set (e.g., there is not an external lookup for this lookup), then processing proceeds to process block 876. If the child node is not an internal node, then as determined in process block 880, if there is a match of the lookup string, then in process block 881 the next address is set to the best address, and processing proceeds via connector 8A (883) to connector 8A (811) FIG. 8A. Otherwise, in process block 882, a no match result is sent in process block 882, and processing is completed as indicated by process block 883. Otherwise, if an internal node as determined in process block 876, then in process block 878, the next address is set to the value of the child pointer, and processing proceeds via connector 8A (879) to connector 8A (811) FIG. 8A.

Otherwise, the next address of the child node is calculated in process block 884. If the current node is a stop node (e.g., indicates a stop traversal indication) as determined in process block 886, then the state of the search is returned or sent in process block 888, and processing is completed as indicated by process block 889. Otherwise, processing proceeds via connector 8A (887) to connector 8A (811) FIG. 8A.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A non-transitory computer-readable medium tangibly encoded thereon a data structure, the data structure comprising:
   a first search node;
   a first child array including a first internal node and a second search node; and
   a first leaf array including a plurality of first leaf array entries;
   wherein the first search node includes a pointer to the first child array;
   wherein the first internal node includes a pointer to the first leaf array; and
   wherein the second search node includes a pointer to one of the plurality of first leaf array entries.

2. The non-transitory computer-readable medium of claim 1, wherein the first internal node is the first element of the first child array.

3. The non-transitory computer-readable medium of claim 1, wherein the pointer of the first internal node and the pointer of the second search node indicate different said first leaf array entries.

4. The non-transitory computer-readable medium of claim 1, wherein the data structure includes a second child array; and wherein the second search node includes a pointer to the second child array.

5. The non-transitory computer-readable medium of claim 4, wherein the data structure includes a second leaf array including a plurality of second leaf array entries; and
wherein the second child array includes a second internal node, the second internal node including a pointer to the second leaf array.

6. The non-transitory computer-readable medium of claim 5, wherein the second internal node is the first element of the second child array.

7. The non-transitory computer-readable medium of claim 6, wherein the second child array includes a third search or end node, wherein said second search or end node includes a pointer to one of the plurality of second leaf array entries.

8. The non-transitory computer-readable medium of claim 7, wherein the pointer of the second internal node and the pointer of the third search or end node indicate different said second leaf array entries.

9. The non-transitory computer-readable medium of claim 1, wherein the first search node represents a stride of a first length and the second search node represents of a stride of a second length, wherein the first and second lengths are different.

10. The non-transitory computer-readable medium of claim 9, wherein the first search node includes a first indicator of the first length and the second search node includes a second indicator of the second length.

11. A method performed using a tree data structure representing a plurality of prefixes partitioned into a plurality of strides of a number of tree levels greater than one, each of the plurality of strides represented by a tree bitmap and indications of child paths represented by an extending bitmap, the method comprising:
 (a) retrieving a search node at a current level within the tree data structure;
 (b) updating a current best match identifier in response to determining if a new best match exists;
 (c) indexing into a current level extending bitmap to determine whether or not a matching next level node exists;
 (d) in response to said determining the matching next level node exists, repeating step (a), (b) and (c) for the current level being a next level identified based on said indexing into the current level extending bitmap to determine an offset within an internal node indicted by the search node; and
 (e) in response to said determining the matching next level node does not exist, performing steps including:
 retrieving an internal node indicated by the current level search node; and
 identifying a search result based on the current best match identifier or based on a pointer in the current level search node to a leaf node.

12. The method of claim 11, comprising: in response to determining the search node does not exist at the current level, indexing into an end node to identify the search result.

13. The method of claim 12, comprising updating the current best match identifier based on a pointer in the end node.

14. An apparatus for determining a search result based on a tree data structure representing a plurality of prefixes partitioned into a plurality of strides of a number of tree levels greater than one, each of the plurality of strides represented by a tree bitmap and indications of child paths represented by an extending bitmap, the apparatus comprising:
 means for retrieving a search node at a current level within the tree data structure;
 means for updating a current best match identifier in response to determining if a new best match exists;
 means for indexing into a current level extending bitmap to determine whether or not a matching next level node exists;
 means for indexing into the current level extending bitmap to determine an offset within an internal node indicted by the search node;
 means for retrieving an internal node indicated by the current level search node; and
 means for identifying a search result based on the current best match identifier or based on a pointer in the current level search node to a leaf node.

15. The apparatus of claim 14, comprising means for indexing into an end node to identify the search result.

16. The apparatus of claim 15, comprising means for updating the current best match identifier based on a pointer in the end node.

17. One or more non-transitory, tangible computer-readable media encoded thereon with computer-executable instructions for performing operations, when executed by one or more processing elements, using a tree data structure representing a plurality of prefixes partitioned into a plurality of strides of a number of tree levels greater than one, each of the plurality of strides represented by a tree bitmap and indications of child paths represented by an extending bitmap, said operations comprising:
 (a) retrieving a search node at a current level within the tree data structure;
 (b) updating a current best match identifier in response to determining if a new best match exists;
 (c) indexing into a current level extending bitmap to determine whether or not a matching next level node exists;
 (d) in response to said determining the matching next level node exists, repeating step (a), (b) and (c) for the current level being a next level identified based on said indexing into the current level extending bitmap to determine an offset within an internal node indicted by the search node; and
 (e) in response to said determining the matching next level node does not exist, performing steps including:
 retrieving an internal node indicated by the current level search node; and
 identifying a search result based on the current best match identifier or based on a pointer in the current level search node to a leaf node.

18. The non-transitory computer-readable media of claim 17, wherein said operations include: in response to determining the search node does not exist at the current level, indexing into an end node to identify the search result.

19. The non-transitory computer-readable media of claim 18, wherein said operations include updating the current best match identifier based on a pointer in the end node.

* * * * *

UNITED STATES PATENT AND TRADEMARK OFFICE
CERTIFICATE OF CORRECTION

| | |
|---|---|
| PATENT NO. | : 7,899,067 B2 |
| APPLICATION NO. | : 10/161504 |
| DATED | : March 1, 2011 |
| INVENTOR(S) | : Rangarajan et al. |

It is certified that error appears in the above-identified patent and that said Letters Patent is hereby corrected as shown below:

Col. 7, line 24, replace "TREE" with -- TRIE --

Col. 10, line 27, replace "leaf array LA1 (215)," with -- leaf array LA2 (215), --

Col. 17, Claim 11, line 32, replace "performed" with -- performed, by one or more processing elements, --

Col. 17, Claim 11, line 40, replace "updating" with -- updating, by said one or more processing elements, --

Col. 17, Claim 11, line 42, replace "indexing" with -- indexing, by said one or more processing elements, --

Col. 17, Claim 11, line 45, replace "exists," with -- exists by said one or more processing elements, --

Col. 17, Claim 11, line 54, replace "identifying" with -- identifying, by said one or more processing elements, --

Col. 18, Claim 18, line 54, replace "non-transitory" with -- non-transitory, tangible --

Col. 18, Claim 19, line 58, replace "non-transitory" with -- non-transitory, tangible --

Signed and Sealed this
Twenty-sixth Day of April, 2011

David J. Kappos
*Director of the United States Patent and Trademark Office*